United States Patent
Lee et al.

(10) Patent No.: US 11,069,026 B2
(45) Date of Patent: Jul. 20, 2021

(54) METHOD FOR PROCESSING PROJECTION-BASED FRAME THAT INCLUDES PROJECTION FACES PACKED IN CUBE-BASED PROJECTION LAYOUT WITH PADDING

(71) Applicant: MEDIATEK INC., Hsin-Chu (TW)

(72) Inventors: Ya-Hsuan Lee, Hsin-Chu (TW); Jian-Liang Lin, Hsin-Chu (TW)

(73) Assignee: MEDIATEK INC., Hsin-Chu (TW)

(*) Notice: Subject to any disclaimer, the term of this patent is extended or adjusted under 35 U.S.C. 154(b) by 0 days.

(21) Appl. No.: 16/286,622

(22) Filed: Feb. 27, 2019

(65) Prior Publication Data
US 2019/0272616 A1    Sep. 5, 2019

Related U.S. Application Data

(60) Provisional application No. 62/712,290, filed on Jul. 31, 2018, provisional application No. 62/637,425, filed on Mar. 2, 2018.

(51) Int. Cl.
*G06T 3/00* (2006.01)
*G06T 7/13* (2017.01)
*G06T 3/40* (2006.01)

(52) U.S. Cl.
CPC ............ *G06T 3/005* (2013.01); *G06T 3/0087* (2013.01); *G06T 3/403* (2013.01); *G06T 7/13* (2017.01)

(58) Field of Classification Search
CPC ...................................................... G06T 3/40
See application file for complete search history.

(56) References Cited

U.S. PATENT DOCUMENTS

| 10,467,775 B1* | 11/2019 | Waggoner ............ H04N 19/597 |
| 2014/0218354 A1* | 8/2014 | Park, II .................... G06T 19/00 345/419 |
| 2015/0264259 A1* | 9/2015 | Raghoebardajal ......................... H04N 5/23238 348/36 |

(Continued)

FOREIGN PATENT DOCUMENTS

| CN | 106529419 A | 3/2017 |
| CN | 106686381 A | 5/2017 |

(Continued)

OTHER PUBLICATIONS

"International Search Report" dated May 29, 2019 for International application No. PCT/CN2019/076665, International filing date: Mar. 1, 2019.

(Continued)

*Primary Examiner* — Phong X Nguyen
(74) *Attorney, Agent, or Firm* — Winston Hsu

(57) ABSTRACT

A video processing method includes: obtaining a plurality of square projection faces from an omnidirectional content of a sphere according to a cube-based projection, scaling the square projection faces to generate a plurality of scaled projection faces, respectively, creating at least one padding region, generating a projection-based frame by packing the scaled projection faces and said at least one padding region in a projection layout of the cube-based projection, and encoding the projection-based frame to generate a part of a bitstream.

17 Claims, 15 Drawing Sheets

(56) References Cited

U.S. PATENT DOCUMENTS

| | | | |
|---|---|---|---|
| 2015/0341552 A1* | 11/2015 | Chen | G06T 17/00 348/38 |
| 2016/0142697 A1* | 5/2016 | Budagavi | H04N 13/156 348/43 |
| 2017/0026659 A1* | 1/2017 | Lin | H04N 19/426 |
| 2017/0200255 A1* | 7/2017 | Lin | G06T 7/90 |
| 2017/0230668 A1* | 8/2017 | Lin | H04N 19/563 |
| 2017/0270634 A1* | 9/2017 | Eggebrecht | G06T 15/04 |
| 2017/0280126 A1* | 9/2017 | Van der Auwera | G06T 3/0062 |
| 2017/0358126 A1* | 12/2017 | Lim | H04N 13/243 |
| 2017/0374385 A1* | 12/2017 | Huang | H04N 19/105 |
| 2018/0027178 A1* | 1/2018 | Macmillan | H04N 13/243 348/38 |
| 2018/0101931 A1* | 4/2018 | Abbas | H04N 5/2258 |
| 2018/0103242 A1* | 4/2018 | Budagavi | H04N 13/178 |
| 2018/0167613 A1 | 6/2018 | Hannuksela | |
| 2018/0199029 A1* | 7/2018 | Van der Auwera | H04N 13/111 |
| 2018/0276789 A1 | 9/2018 | Van der Auwera | |
| 2018/0286109 A1* | 10/2018 | Woo | G02B 27/017 |
| 2018/0359459 A1 | 12/2018 | Lee | |
| 2019/0014347 A1 | 1/2019 | Hendry | |
| 2019/0082184 A1* | 3/2019 | Hannuksela | H04N 13/15 |
| 2019/0253624 A1* | 8/2019 | Kim | H04N 19/159 |
| 2019/0342578 A1* | 11/2019 | Lee | H04N 19/176 |
| 2020/0092582 A1 | 3/2020 | Xiu | |

FOREIGN PATENT DOCUMENTS

| | | | |
|---|---|---|---|
| CN | 106780317 A | 5/2017 | |
| CN | 107113414 A | 8/2017 | |
| TW | I527433 B | 3/2016 | |
| TW | I611689 B | 1/2018 | |
| WO | 2017/118377 A1 | 7/2017 | |
| WO | 2017/190710 A1 | 11/2017 | |
| WO | 2017/220012 A1 | 12/2017 | |
| WO | 2018/001194 A1 | 1/2018 | |
| WO | 2018/035721 A1 | 3/2018 | |
| WO | WO 2018/035721 | * 3/2018 | H04N 19/70 |

OTHER PUBLICATIONS

"International Search Report" dated Jun. 4, 2019 for International application No. PCT/CN2019/076685, International filing date: Mar. 1, 2019.

Yuwen He et al., AHG8: Geometry padding for 360 video coding, Joint Video Exploration Team (JVEET) of ITU-T SG 16 WP 3 and ISO/IEC JTC 1/SC 29/WG 11, 4th Meeting: Chengdu, CN, Oct. 15-21, 2016, Document: JVET-D0075, pp. 1-10, topics 1-2, figure 1-12.

* cited by examiner

METHOD FOR PROCESSING PROJECTION-BASED FRAME THAT INCLUDES PROJECTION FACES PACKED IN CUBE-BASED PROJECTION LAYOUT WITH PADDING

CROSS REFERENCE TO RELATED APPLICATIONS

This application claims the benefit of U.S. provisional application No. 62/637,425 filed on Mar. 2, 2018 and U.S. provisional application No. 62/712,290 filed on Jul. 31, 2018. The entire contents of related applications, including U.S. provisional application No. 62/637,425 and U.S. provisional application No. 62/712,290, are incorporated herein by reference.

BACKGROUND

The present invention relates to processing omnidirectional image/video content, and more particularly, to a method for processing a projection-based frame that includes projection faces packed in a cube-based projection layout with padding.

Virtual reality (VR) with head-mounted displays (HMDs) is associated with a variety of applications. The ability to show wide field of view content to a user can be used to provide immersive visual experiences. A real-world environment has to be captured in all directions resulting in an omnidirectional image content corresponding to a sphere. With advances in camera rigs and HMDs, the delivery of VR content may soon become the bottleneck due to the high bitrate required for representing such a 360-degree image content. When the resolution of the omnidirectional video is 4K or higher, data compression/encoding is critical to bitrate reduction.

In general, the omnidirectional video content corresponding to the sphere is transformed into a sequence of images, each of which is a projection-based frame with a 360-degree image content represented by one or more projection faces arranged in a 360-degree Virtual Reality (360 VR) projection layout, and then the sequence of the projection-based frames is encoded into a bitstream for transmission. The projection-based frame may have image content discontinuity at layout boundaries and/or face edges. As a result, the image quality around layout boundaries and/or face edges after compression may be poor. Moreover, artifacts may be introduced by projection layout conversion of a decoded projection-based frame, thus leading to image quality degradation of a converted projection-based frame.

SUMMARY

One of the objectives of the claimed invention is to provide a method for processing a projection-based frame that includes projection faces packed in a cube-based projection layout with padding.

According to a first aspect of the present invention, an exemplary video processing method is disclosed. The exemplary video processing method includes: obtaining a plurality of square projection faces from an omnidirectional content of a sphere according to a cube-based projection; scaling the square projection faces to generate a plurality of scaled projection faces, respectively; creating, by a padding circuit, at least one padding region; generating a projection-based frame by packing the scaled projection faces and said at least one padding region in a projection layout of the cube-based projection; and encoding the projection-based frame to generate a part of a bitstream.

According to a second aspect of the present invention, an exemplary video processing method is disclosed. The exemplary video processing method includes: receiving a part of a bitstream, and decoding the part of the bitstream to generate a decoded projection-based frame with a plurality of projection faces and at least one padding region packed in a projection layout of a cube-based projection. The step of decoding the part of the bitstream includes: reconstructing a first pixel by blending a decoded pixel value obtained for the first pixel and a decoded pixel value obtained for a second pixel to generate an updated pixel value of the first pixel. The blending step includes: applying, by a blending circuit, a first weighting factor to the decoded pixel value obtained for the first pixel, and applying, by the blending circuit, a second weighting factor to the decoded pixel value obtained for the second pixel, wherein one of the first pixel and the second pixel is included in one of the projection faces, another of the first pixel and the second pixel is included in said at least one padding region, and settings of the first weighting factor and the second weighting factor are independent of a padding size of said at least one padding region.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
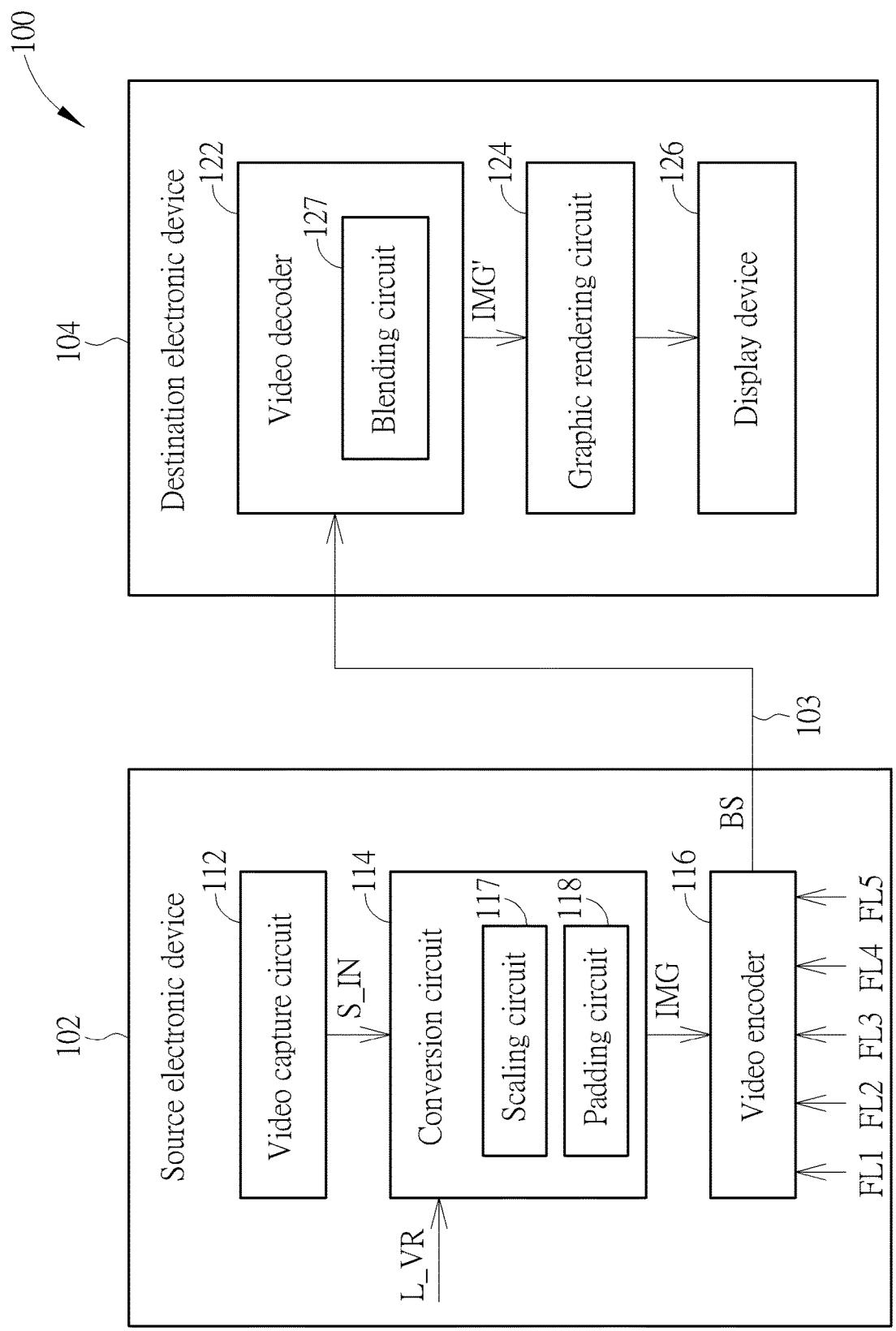
FIG. 1 is a diagram illustrating a 360-degree Virtual Reality (360 VR) system according to an embodiment of the present invention.

FIG. 1 is a diagram illustrating a 360-degree Virtual Reality (360 VR) system according to an embodiment of the present invention. The 360 VR system 100 includes two video processing apparatuses (e.g., a source electronic device 102 and a destination electronic device 104). The source electronic device 102 includes a video capture device 112, a conversion circuit 114, and a video encoder 116. For example, the video capture device 112 may be a set of cameras used to provide an omnidirectional image content (e.g., multiple images that cover the whole surroundings) S_IN corresponding to a sphere. The conversion circuit 114 is coupled between the video capture device 112 and the video encoder 116. The conversion circuit 114 generates a projection-based frame IMG with a 360-degree Virtual Reality (360 VR) projection layout L_VR according to the omnidirectional image content S_IN. For example, the projection-based frame IMG may be one frame included in a sequence of projection-based frames generated from the conversion circuit 114. The video encoder 116 is an encoding circuit used to encode/compress the projection-based frame IMG to generate a part of a bitstream BS. Further, the video encoder 116 outputs the bitstream BS to the destination electronic device 104 via a transmission means 103. For example, the sequence of projection-based frames may be encoded into the bitstream BS, and the transmission means 103 may be a wired/wireless communication link or a storage medium.

The destination electronic device 104 may be a head-mounted display (HMD) device. As shown in FIG. 1, the destination electronic device 104 includes a video decoder 122, a graphic rendering circuit 124, and a display device 126. The video decoder 122 is a decoding circuit used to receive the bitstream BS from the transmission means 103 (e.g., wired/wireless communication link or storage medium), and decode apart of the received bitstream BS to generate a decoded frame IMG'. For example, the video decoder 122 generates a sequence of decoded frames by decoding the received bitstream BS, where the decoded frame IMG' is one frame included in the sequence of decoded frames. In this embodiment, the projection-based frame IMG to be encoded by the video encoder 116 at the encoder side has a 360 VR projection layout L_VR. Hence, after a part of the bitstream BS is decoded by the video decoder 122 at the decoder side, the decoded frame IMG' is a decoded projection-based frame having the same 360 VR projection layout L_VR. The graphic rendering circuit 124 is coupled between the video decoder 122 and the display device 126. The graphic rendering circuit 124 renders and displays an output image data on the display device 126 according to the decoded frame IMG'. For example, a viewport area associated with a portion of the 360-degree image content carried by the decoded frame IMG' may be displayed on the display device 126 via the graphic rendering circuit 124.

Figure 2:
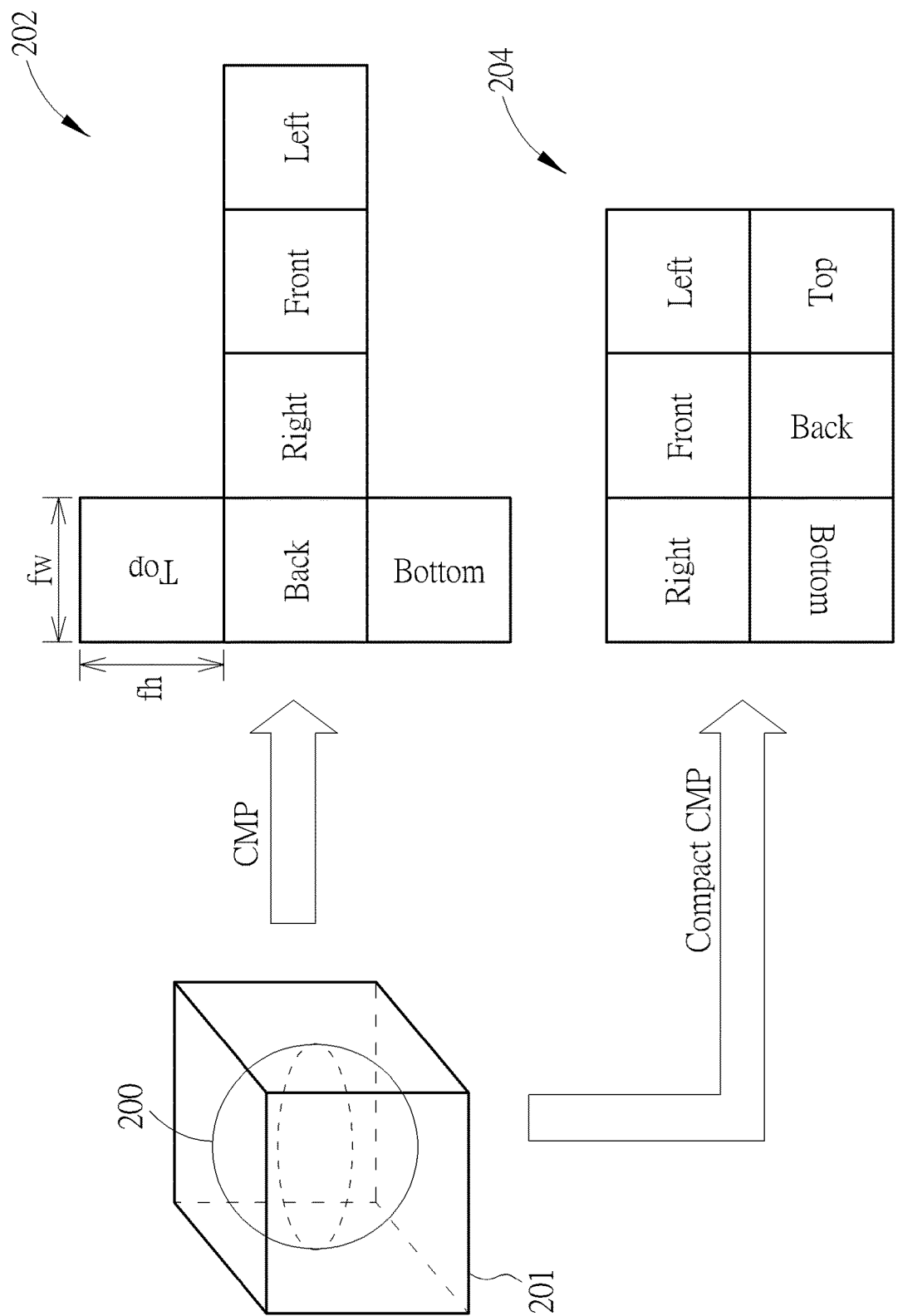
FIG. 2 is a diagram illustrating a cube-based projection according to an embodiment of the present invention.

As mentioned above, the conversion circuit 114 generates the projection-based frame IMG according to the 360 VR projection layout L_VR and the omnidirectional image content S_IN. In a case where the 360 VR projection layout L_VR is a cube-based projection layout, six square projection faces are derived from different faces of a cube through a cube-based projection of the omnidirectional image content S_IN on a sphere. FIG. 2 is a diagram illustrating a cube-based projection according to an embodiment of the present invention. The 360-degree image content on a sphere 200 is projected onto six faces of a cube 201, including a top face, a bottom face, a left face, a front face, a right face, and a back face. Specifically, an image content of a north polar region of the sphere 200 is projected onto the top face of the cube 201, an image content of a south polar region of the sphere 200 is projected onto the bottom face of the cube 201, and an image content of an equatorial region of the sphere 200 is projected onto the left face, the front face, the right face, and the back face of the cube 201.

Square projection faces to be packed in a projection layout of the cube-based projection are derived from six faces of the cube 201. For example, a square projection face (labeled by "Top") on a two-dimensional (2D) plane is derived from the top face of the cube 201 in a three-dimensional (3D) space, a square projection face (labeled by "Back") on the 2D plane is derived from the back face of the cube 201 in the 3D space, a square projection face (labeled by "Bottom") on the 2D plane is derived from the bottom face of the cube 201 in the 3D space, a square projection face (labeled by "Right") on the 2D plane is derived from the right face of the cube 201 in the 3D space, a square projection face (labeled by "Front") on the 2D plane is derived from the front face of the cube 201 in the 3D space, and a square projection face (labeled by "Left") on the 2D plane is derived from the left face of the cube 201 in the 3D space. Each of the square projection faces "Top", "back", "Bottom", "Right", "Front", and "Left" has the same face width fw and the same face height fh, where fw=fh. Hence, the square projection faces "Top", "back", "Bottom", "Right", "Front", and "Left" have the same size fw*fh.

When the 360 VR projection layout L_VR is set by a cubemap projection (CMP) layout 202 shown in FIG. 2, the square projection faces "Top", "Back", "Bottom", "Right", "Front", and "Back" are packed in the CMP layout 202 corresponding to an unfolded cube. However, the projection-based frame IMG to be encoded is required to be rectangular. If the CMP layout 202 is directly used for creating the projection-based frame IMG, the projection-based frame IMG has to be filled with dummy areas (e.g., black areas, gray areas, or white areas) to form a rectangular frame for encoding. Alternatively, the projection-based frame IMG can have projected image data arranged in a compact projection layout to avoid using dummy areas (e.g., black areas, gray areas, or white areas). As shown in FIG. 2, the square projection faces "Top", "Back" and "Bottom" are rotated and then packed in the compact CMP layout 204. The orientation of the labels "Right", "Front", "Left", "Top", "Back", and "Bottom" indicates the orientation of the projected image contents. Hence, the square projection faces "Top", "Back", "Bottom", "Right", "Front", and "Back" are arranged in the compact CMP layout 204 that is a 3×2 cube layout. In this way, the coding efficiency can be improved.

The compact CMP layout 204 is a compact cube-based projection layout without padding. Hence, it is possible that packing of square projection faces may result in image content discontinuity edges between adjacent square projection faces. Regarding one 3×1 face row consisting of square projection faces "Right", "Front" and "Left" horizontally packed in the compact CMP layout 204, there is an image content continuity edge between the right side of the square projection face "Right" and the left side of the square projection "Front", and there is an image content continuity edge between the right side of the square projection face "Front" and the left side of the square projection "Left". Regarding the other 3×1 face row consisting of square projection faces "Bottom", "Back" and "Top" horizontally packed in the compact CMP layout 204, there is an image content continuity edge between the right side of the square projection face "Bottom" and the left side of the square projection "Back", and there is an image content continuity edge between the right side of the square projection face "Back" and the left side of the square projection "Top".

Moreover, the compact CMP layout 204 has a top discontinuous boundary (which consists of top sides of square projection faces "Right", "Front" and "Left"), a bottom discontinuous boundary (which consists of bottom sides of square projection faces "Bottom", "Back" and "Top"), a left discontinuous boundary (which consists of left sides of square projection faces "Right" and "Bottom"), and a right discontinuous boundary (which consists of right sides of square projection faces "Left" and "Top").

If the 360 VR projection layout L_VR is set by the compact CMP layout 204, the image quality near the image content discontinuity edges and/or the discontinuous layout boundaries after compression may be poor. More specifically, the projection-based frame IMG after coding may have artifacts due to discontinuous layout boundaries of the compact CMP layout 204 and/or discontinuous edges of the compact CMP layout 204.

Figure 3:
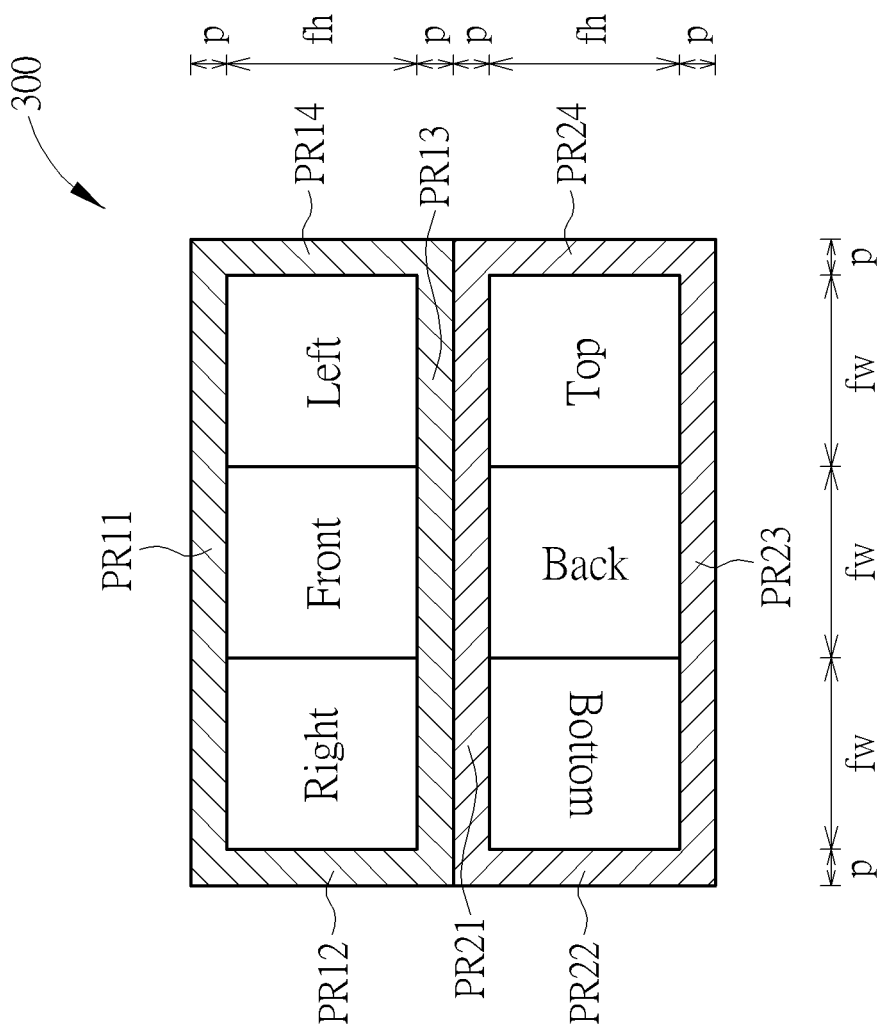
FIG. 3 is a diagram illustrating a cube-based projection layout with padding according to an embodiment of the present invention.

Around discontinuous layout boundaries and/or discontinuous face edges, pixel padding can be inserted for reducing the artifacts. FIG. 3 is a diagram illustrating a cube-based projection layout with padding according to an embodiment of the present invention. The compact CMP layout with padding 300 is capable of improving the image quality at discontinuous layout boundaries and discontinuous face edges after compression. For example, the conversion circuit 114 receives an omnidirectional image content of the sphere 200 from the video capture device 112, and obtains a plurality of square projection faces "Top", "Back", "Bottom", "Right", "Front", and "Left" from cube-based projection of the omnidirectional image content of the sphere 200. As shown in FIG. 1, the conversion circuit 114 has a padding circuit 118 that is arranged to generate at least one padding region. When the 360 VR projection layout L_VR is set by the compact CMP layout with padding 300, the padding circuit 118 is enabled. The conversion circuit 114 creates the projection-based frame IMG by packing square projection faces and padding regions in the compact CMP layout with padding 300. The square projection faces "Top", "Back", "Bottom", "Right", "Front", and "Left" are categorized into a first group and a second group. The first group includes square projection faces "Right", "Front" and "Left", and represents a first rectangular segment whose content is continuous. The second group includes square projection faces "Top", "Back" and "Bottom", and represents a second rectangular segment whose content is continuous.

The padding circuit 118 is an electronic circuit. In one exemplary design, the padding circuit 118 may be implemented by dedicated hardware for dealing with the padding function. In another exemplary design, the padding circuit 118 may be implemented by a processor which executes a program code for dealing with the padding function. However, these are for illustrative purposes only, and are not meant to be limitations of the present invention.

In accordance with the compact CMP layout with padding 300, the padding circuit 118 creates a top padding region PR11 (which includes one padding region extended from the top side of the square projection face "Right", one padding region extended from the top side of the square projection face "Front", and one padding region extended from the top side of the square projection face "Left"), a left padding region PR12 (which includes one padding region extended from the left side of the square projection face "Right"), a bottom padding region PR13 (which includes one padding region extended from the bottom side of the square projection face "Right", one padding region extended from the bottom side of the square projection face "Front", and one padding region extended from the bottom side of the square projection face "Left"), and a right padding region PR14 (which includes one padding region extended from the right side of the square projection face "Left") for the first rectangular segment, and creates a top padding region PR21 (which includes one padding region extended from the top side of the square projection face "Bottom", one padding region extended from the top side of the square projection face "Back", and one padding region extended from the top side of the square projection face "Top"), a left padding region PR22 (which includes one padding region extended from the left side of the square projection face "Bottom"), a bottom padding region PR23 (which includes one padding region extended from the bottom side of the square projection face "Bottom", one padding region extended from the bottom side of the square projection face "Back", and one padding region extended from the bottom side of the square projection face "Top"), and a right padding region PR24 (which includes one padding region extended from the right side of the square projection face "Top") for the second rectangular segment, where each padding region has the same padding size p (e.g., p=4).

In one exemplary padding implementation, the padding circuit 118 applies geometry padding to a square projection face to determine pixel values of pixels included in a padding region that connects with at least the square projection face. Taking the compact CMP layout with padding 300 for example, the top padding region PR11 includes a left geometry mapping region, a middle geometry mapping region, and a right geometry mapping region. The left geometry mapping region of the top padding region PR11 is obtained from mapping the image content of a region on the sphere 200 onto the left geometry mapping region, wherein the region on the sphere 200 is adjacent to a region from which the square projection face "Right" is obtained. Hence, there is image content continuity between the square projection face "Right" and the left geometry mapping region extended from the square projection face "Right" (i.e., image content is continuously represented in the square projection face "Right" and the left geometry mapping region). Similarly, the middle geometry mapping region of the top padding region PR11 is obtained from mapping the image content of a region on the sphere 200 onto the middle geometry mapping region, wherein the region on the sphere 200 is adjacent to a region from which the square projection face "Front" is obtained. Hence, there is image content continuity between the square projection face "Front" and the middle geometry mapping region extended from the square projection face "Front" (i.e., image content is continuously represented in the square projection face "Front" and the middle geometry mapping region). In addition, the right geometry mapping region of the top padding region PR11 is obtained from mapping the image content of a region on the sphere 200 onto the right geometry mapping region, wherein the region on the sphere 200 is adjacent to a region from which the square projection face "Left" is obtained. Hence, there is image content continuity between the square projection face "Left" and the right geometry mapping region extended from the square projection face "Left" (i.e., image content is continuously represented in the square projection face "Left" and the right geometry mapping region).

In another exemplary padding implementation, the padding circuit 118 sets pixel values of pixels included in a padding region by duplicating pixel values of specific pixels included in a square projection face that connects with the padding region. Taking the compact CMP layout with padding 300 for example, the top padding region PR11 includes a left duplication region, a middle duplication region, and a right duplication region. Regarding generation of the left duplication region of the top padding region PR11, edge pixels at the top side of the square projection face "Right" are duplicated to create padding pixels extended from the top side of the square projection face "Right". Regarding generation of the middle duplication region of the top padding region PR11, edge pixels at the top side of the square projection face "Front" are duplicated to create padding pixels extended from the top side of the square projection face "Front". Regarding generation of the right duplication region of the top padding region PR11, edge pixels at the top side of the square projection face "Left" are duplicated to create padding pixels extended from the top side of the square projection face "Left".

In yet another exemplary padding implementation, the padding circuit 118 sets pixel values of pixels included in a padding region extended from one side of a first scaled projection face by duplicating pixel values of specific pixels included in a second square projection face. For example, the first square projection face is obtained from an image content of a first region on a sphere, and the second square projection face is obtained from an image content of a second region on the sphere, where the second region is adjacent to the first region. A padding region extended from one side of the first square projection face can be obtained from duplicating a partial region of the second square projection face. Taking the compact CMP layout with padding 300 for example, the top padding region PR11 includes a left duplication region, a middle duplication region, and a right duplication region. The left duplication region of the top padding region PR11 is set by duplicating a first partial region of the square projection face "Top". The middle duplication region of the top padding region PR11 is set by duplicating a second partial region of the square projection face "Top". The right duplication region of the top padding region PR11 is set by duplicating a third partial region of the square projection face "Top".

When the projection-based frame IMG has the compact CMP layout 204 shown in FIG. 2, the projection-based frame IMG has a frame width W=3*fw and a frame height H=2*fh. However, when the projection-based frame IMG has the compact CMP layout with padding 300 shown in FIG. 3, the projection-based frame IMG has a frame width W'=3*fw+2*p and a frame height H'=3*fh+4*p, where W'>W and H'>H. Since the size of the projection-based frame IMG is increased due to insertion of padding regions PR11-PR14 and PR21-PR24, the encoding burden of the video encoder 116 and the decoding burden of the video decoder 122 are increased inevitably.

Figure 4:
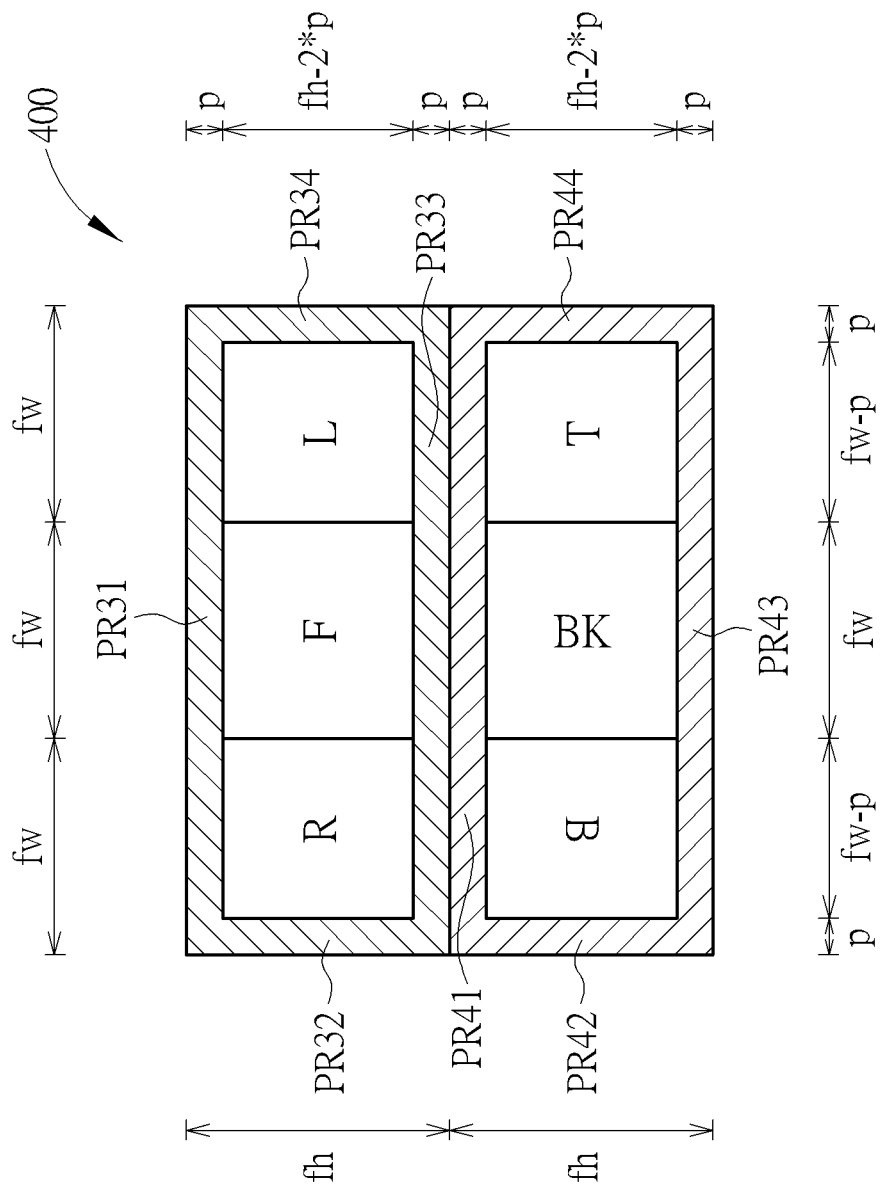
FIG. 4 is a diagram illustrating a first cube-based projection layout with padding and face scaling according to an embodiment of the present invention.

To address this issue, the present invention proposes a cube-based projection layout with padding and face scaling. FIG. 4 is a diagram illustrating a first cube-based projection layout with padding and face scaling according to an embodiment of the present invention. Like the compact CMP layout with padding 300, the compact CMP layout with padding and face scaling 400 is also capable of improving the image quality at discontinuous layout boundaries and discontinuous face edges after compression. Compared to the compact CMP layout with padding 300, the compact CMP layout with padding and face scaling 400 has a smaller size. For example, the size of the compact CMP layout with padding and face scaling 400 is the same as that of a compact CMP layout without padding (e.g., compact CMP layout 204 shown in FIG. 2).

When the 360 VR projection layout L_VR is set by the compact CMP layout with padding and face scaling 400, a scaling circuit 117 and a padding circuit 118 implemented in the conversion circuit 114 are both enabled. For example, the conversion circuit 114 receives an omnidirectional image content of the sphere 200 from the video capture device 112, and obtains a plurality of square projection faces "Top", "Back", "Bottom", "Right", "Front", and "Left" from cube-based projection of the omnidirectional image content of the sphere 200, where the square projection faces "Top", "Back", "Bottom", "Right", "Front", and "Left" have the same face width fw and the same face height fh. The scaling circuit 117 is arranged to scale the square projection faces "Top", "Back", "Bottom", "Right", "Front", and "Left" to generate a plurality of scaled projection faces (labeled by "T", "BK", "B", "R", "F", and "L"), respectively. The orientation of the labels "T", "BK", "B", "R", "F", and "L" indicates the orientation of the projected image contents. In addition, the padding circuit 118 is arranged to generate at least one padding region. The conversion circuit 114 creates the projection-based frame IMG by packing scaled projection faces and padding regions in the compact CMP layout with padding and face scaling 400.

The scaling circuit 117 is an electronic circuit. In one exemplary design, the scaling circuit 117 may be implemented by dedicated hardware for dealing with the scaling function. In another exemplary design, the scaling circuit 117 may be implemented by a processor which executes a program code for dealing with the scaling function. However, these are for illustrative purposes only, and are not meant to be limitations of the present invention.

The scaled projection faces "T", "BK", "B", "R", "F", and "L" are categorized into a first group and a second group. The first group includes scaled projection faces "R", "F" and "L", and represents a first rectangular segment whose content is continuous. The second group includes scaled projection faces "T", "BK" and "B", and represents a second rectangular segment whose content is continuous. In accordance with the compact CMP layout with padding and face scaling 400, the padding circuit 118 creates a top padding region PR31 (which includes one padding region extended from the top side of the scaled projection face "R", one padding region extended from the top side of the scaled projection face "F", and one padding region extended from the top side of the scaled projection face "L"), a left padding region PR32 (which includes one padding region extended from the left side of the scaled projection face "R"), a bottom padding region PR33 (which includes one padding region extended from the bottom side of the scaled projection face "R", one padding region extended from the bottom side of the scaled projection face "F", and one padding region extended from the bottom side of the scaled projection face "L"), and a right padding region PR34 (which includes one padding region extended from the right size of the square projection face "L") for the first rectangular segment, and creates a top padding region PR41 (which includes one padding region extended from the top side of the scaled projection face "B", one padding region extended from the top side of the scaled projection face "BK", and one padding region extended from the top side of the scaled projection face "T"), a left padding region PR42 (which includes one padding region extended from the left side of the scaled projection face "B"), a bottom padding region PR43 (which includes one padding region extended from the bottom side of the scaled projection face "B", one padding region extended from the bottom side of the scaled projection face "BK", and one padding region extended from the bottom side of the scaled projection face "T"), and a right padding region PR44 (which includes one padding region extended from the right side of the scaled projection face "T") for the second rectangular segment, where each padding region has the same padding size p (e.g., p=4).

As shown in FIG. 4, the top padding region PR31 forms at least a portion of a top boundary of the compact CMP layout with padding and face scaling 400, the left padding region PR32/PR42 forms at least a portion of a left boundary of the compact CMP layout with padding and face scaling 400, the bottom padding region PR43 forms at least a portion of a bottom boundary of the compact CMP layout with padding and face scaling 400, and the right padding region PR32/PR44 forms at least a portion of a right boundary of the compact CMP layout with padding and face scaling 400.

If the bottom side of the scaled projection face "R" connects with the top side of the scaled projection face "B", an image content discontinuity edge exists between the bottom side of the scaled projection face "R" and the top side of the scaled projection face "B". If the bottom side of the scaled projection face "F" connects with the top side of the scaled projection face "BK", an image content discontinuity edge exists between the bottom side of the scaled projection face "F" and the top side of the scaled projection face "BK". If the bottom side of the scaled projection face "L" connects with the top side of the scaled projection face "T", an image content discontinuity edge exists between the bottom side of the scaled projection face "L" and the top side of the scaled projection face "T". The bottom padding region PR33 and the top padding region PR41 form a horizontal padding region in the middle of the projection layout, where the horizontal padding region connects with the bottom side of the scaled projection face "R" and the top side of the scaled projection face "B" for isolating the bottom side of the scaled projection face "R" from the top side of the scaled projection face "B", connects the bottom side of the scaled projection face "F" and the top side of the scaled projection face "BK" for isolating the bottom side of the scaled projection face "F" from the top side of the scaled projection face "BK", and connects the bottom side of the scaled projection face "L" and the top side of the scaled projection face "T" for isolating the bottom side of the scaled projection face "L" from the top side of the scaled projection face "T".

Figure 5:
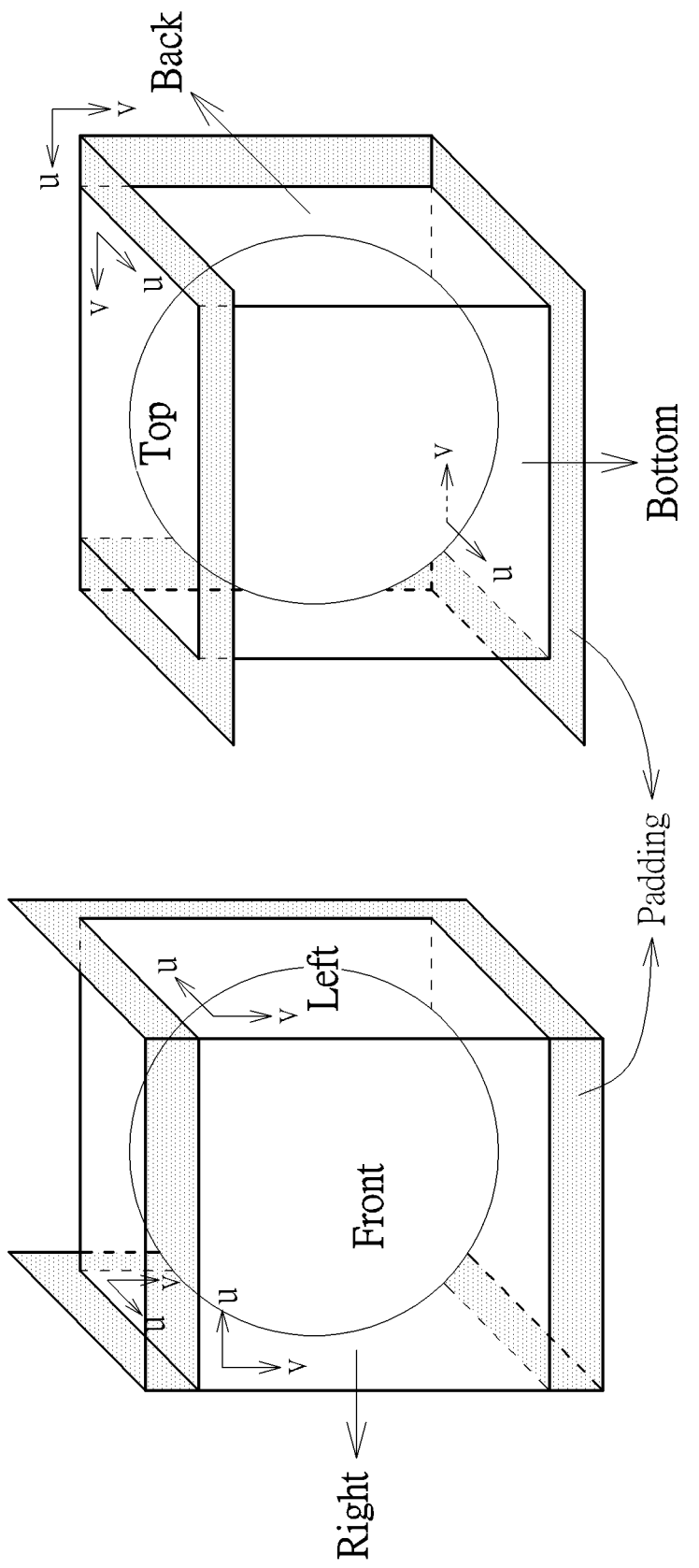
FIG. 5 is a diagram illustrating a u-axis and a v-axis defined for each square projection face according to an embodiment of the present invention.

In this embodiment, all of the scaled projection faces "T", "BK", "B", "R", "F", and "L" do not have the same size. More specifically, a scaling operation of a square projection face is configured on the basis of padding region distribution associated with a scaled projection face obtained from the square projection face. Please refer to FIG. 4 in conjunction with FIG. 5. FIG. 5 is a diagram illustrating a u-axis and a v-axis defined for each square projection face according to an embodiment of the present invention. The scaled projection face "F" is generated from applying a scaling factor 1 to the u-axis of the square projection face "Front" and applying a scaling factor $s_2$ to the v-axis of the square projection face "Front", where $$s_2 = \frac{fh - 2 \cdot p}{fh} = \frac{fw - 2 \cdot p}{fw}.$$

The scaled projection face "BK" is generated from applying the scaling factor $s_2$ to the u-axis of the square projection face "Back" and applying the scaling factor 1 to the v-axis of the square projection face "Back". The scaled projection face "R" is generated from applying a scaling factor $s_1$ to the u-axis of the square projection face "Right" and applying the scaling factor $s_2$ to the v-axis of the square projection face "Right", where $$s_1 = \frac{fw - p}{fw} = \frac{fh - p}{fh}.$$

The scaled projection face "L" is generated from applying the scaling factor $s_1$ to the u-axis of the square projection face "Left" and applying the scaling factor $s_2$ to the v-axis of the square projection face "Left". The scaled projection face "T" is generated from applying the scaling factor $s_1$ to the u-axis of the square projection face "Top" and applying the scaling factor $s_2$ to the v-axis of the square projection face "Top". The scaled projection face "B" is generated from applying the scaling factor $s_1$ to the u-axis of the square projection face "Bottom" and applying the scaling factor $s_2$ to the v-axis of the square projection face "Bottom". The settings of scaling factors for different square projection faces are listed in the following table.

| Face | Axis | Scaling Factor |
| --- | --- | --- |
| Front | u | 1 |
|  | v | $s_2$ |
| Back | u | $s_2$ |
|  | v | 1 |
| Right | u | $s_1$ |
| Left |  |  |
| Top |  |  |
| Bottom | v | $s_2$ |

As shown in FIG. 4, each of the scaled projection faces "F" and "BK" has a size of fw*(fh−2*p), and each of the scaled projection faces "B", and "T" has a size of (fw−p)*(fh−2*p). When the projection-based frame IMG has the compact CMP layout with padding and face scaling 400, the projection-based frame IMG has a frame width W=3*fw and a frame height H=2*fh. Hence, a size of a projection-based frame using the compact CMP layout with padding and face scaling 400 remains the same as that of a projection-based frame using a compact CMP layout without padding (e.g., compact CMP layout 204).

Figure 6:
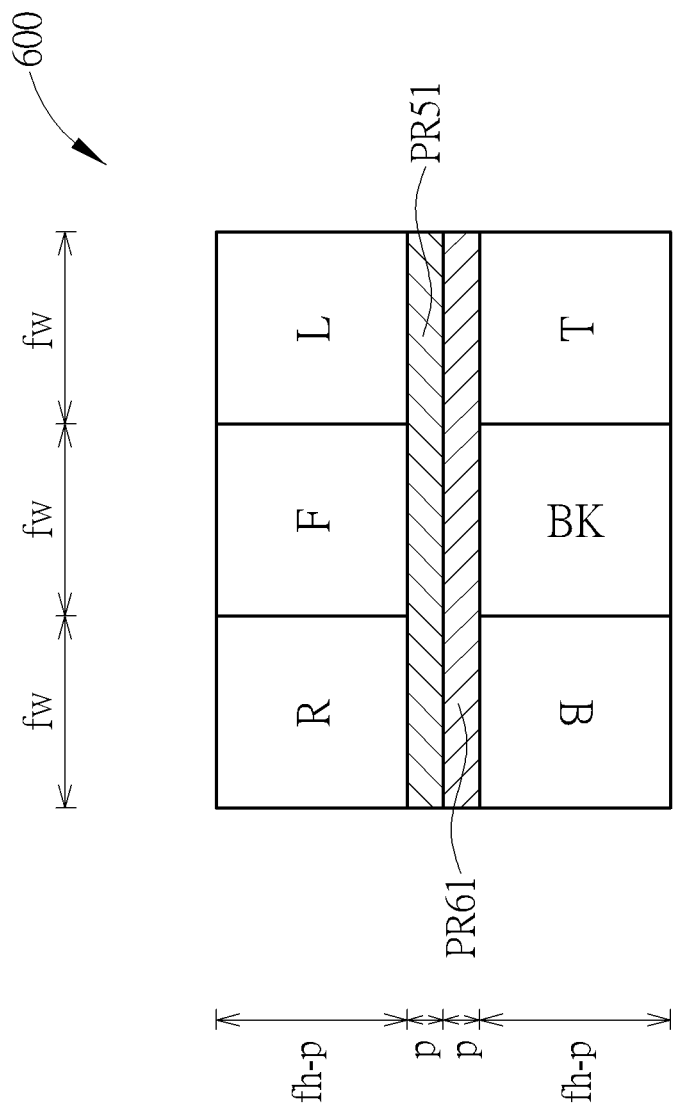
FIG. 6 is a diagram illustrating a second cube-based projection layout with padding and face scaling according to an embodiment of the present invention.

As shown in FIG. 4, padding is applied around two 3×1 face rows. However, this is for illustrative purposes only, and is not meant to be a limitation of the present invention. In one alternative design, padding can be only applied to a middle of a frame to separate two discontinuous 3×1 face rows. FIG. 6 is a diagram illustrating a second cube-based projection layout with padding and face scaling according to an embodiment of the present invention. The compact CMP layout with padding and face scaling 600 is capable of improving the image quality at discontinuous face edges after compression. Compared to the compact CMP layout with padding 300, the compact CMP layout with padding and face scaling 600 has a smaller size. For example, the size of the compact CMP layout with padding and face scaling 600 is the same as that of a compact CMP layout without padding (e.g., compact CMP layout 204 shown in FIG. 2).

When the 360 VR projection layout L_VR is set by the compact CMP layout with padding and face scaling 600, the scaling circuit 117 and the padding circuit 118 implemented in the conversion circuit 114 are both enabled. For example, the conversion circuit 114 receives an omnidirectional image content of the sphere 200 from the video capture device 112, and obtains a plurality of square projection faces "Top", "Back", "Bottom", "Right", "Front", and "Left" from cube-based projection of the omnidirectional image content of the sphere 200, where the square projection faces "Top", "Back", "Bottom", "Right", "Front", and "Left" have the same face width fw and the same face height fh. The scaling circuit 117 is arranged to scale the square projection faces "Top", "Back", "Bottom", "Right", "Front", and "Left" to generate a plurality of scaled projection faces (labeled by "T", "BK", "B", "R", "F", and "L"), respectively. The orientation of the labels "T", "BK", "B", "R", "F", and "L" indicates the orientation of the projected image contents. In addition, the padding circuit 118 is arranged to generate at least one padding region. The conversion circuit 114 creates the projection-based frame IMG by packing scaled projection faces "T", "BK", "B", "R", "F", and "L" and at least one padding region in the compact CMP layout with padding and face scaling 600.

The scaled projection faces "T", "BK", "B", "R", "F", and "L" are categorized into a first group and a second group. The first group includes scaled projection faces "R", "F" and "L", and represents a first rectangular segment whose content is continuous. The second group includes square projection faces "T", "BK" and "B", and represents a second rectangular segment whose content is continuous. In accordance with the compact CMP layout with padding and face scaling 600, the padding circuit 118 creates a bottom padding region PR51 for the first rectangular segment, and creates a top padding region PR61 for the second rectangular segment, where each padding region has the same padding size p (e.g., p=4).

If the bottom side of the scaled projection face "R" connects with the top side of the scaled projection face "B", an image content discontinuity edge exists between the bottom side of the scaled projection face "R" and the top side of the scaled projection face "B". If the bottom side of the scaled projection face "F" connects with the top side of the scaled projection face "BK", an image content discontinuity edge exists between the bottom side of the scaled projection face "F" and the top side of the scaled projection face "BK". If the bottom side of the scaled projection face "L" connects with the top side of the scaled projection face "T", an image content discontinuity edge exists between the bottom side of the scaled projection face "L" and the top side of the scaled projection face "T". The bottom padding region PR51 and the top padding region PR61 form a horizontal padding region in the middle of the projection layout, where the horizontal padding region connects with the bottom side of the scaled projection face "R" and the top side of the scaled projection face "B" for isolating the bottom side of the scaled projection face "R" from the top side of the scaled projection face "B", connects the bottom side of the scaled projection face "F" and the top side of the scaled projection face "BK" for isolating the bottom side of the scaled projection face "F" from the top side of the scaled projection face "BK", and connects the bottom side of the scaled projection face "L" and the top side of the scaled projection face "T" for isolating the bottom side of the scaled projection face "L" from the top side of the scaled projection face "T".

In this embodiment, all of the scaled projection faces "T", "BK", "B", "R", "F", and "L" have the same size. More specifically, a scaling operation of a square projection face is configured on the basis of padding region distribution associated with a scaled projection face obtained from the square projection face. Please refer to FIG. 6 in conjunction with FIG. 5. The scaled projection face "F" is generated from applying a scaling factor 1 to the u-axis of the square projection face "Front" and applying a scaling factor s to the v-axis of the square projection face "Front", where $$s = \frac{fw - p}{fw} = \frac{fh - p}{fh}.$$

The scaled projection face "BK" is generated from applying the scaling factor s to the u-axis of the square projection face "Back" and applying the scaling factor 1 to the v-axis of the square projection face "Back". The scaled projection face "R" is generated from applying the scaling factor 1 to the u-axis of the square projection face "Right" and applying the scaling factor s to the v-axis of the square projection face "Right". The scaled projection face "L" is generated from applying the scaling factor 1 to the u-axis of the square projection face "Left" and applying the scaling factor s to the v-axis of the square projection face "Left". The scaled projection face "T" is generated from applying the scaling factor 1 to the u-axis of the square projection face "Top" and applying the scaling factor s to the v-axis of the square projection face "Top". The scaled projection face "B" is generated from applying the scaling factor 1 to the u-axis of the square projection face "Bottom" and applying the scaling factor s to the v-axis of the square projection face "Bottom". The settings of scaling factors for different square projection faces are listed in the following table.

| Face | Axis | Scaling Factor |
| --- | --- | --- |
| Front | u | 1 |
| Right | | |
| Left | | |
| Top | v | s |
| Bottom | | |
| Back | u | s |
| | v | 1 |

As shown in FIG. 6, each of the scaled projection faces "R", "B", "BK", and "T" has a size of fw*(fh−p). When the projection-based frame IMG has the compact CMP layout with padding and face scaling 600, the projection-based frame IMG has a frame width W=3*fw and a frame height H=2*fh. Hence, a size of a projection-based frame using the compact CMP layout with padding and face scaling 600 remains the same as that of a projection-based frame using a compact CMP layout without padding (e.g., compact CMP layout 204 shown in FIG. 2).

In another alternative design, padding can be applied around each face. In some embodiments of the present invention, projection layout conversion may be performed at the destination electronic device 104 for converting a decoded image with one projection layout into a converted image with a different projection layout. Interpolation may be performed upon pixel values of integer pixels of the decoded image to determine a pixel value that is assigned to an integer pixel of the converted image. To reduce artifacts introduced by projection layout conversion, padding may also be applied to an image content continuity edge between adjacent projection faces.

Figure 7:
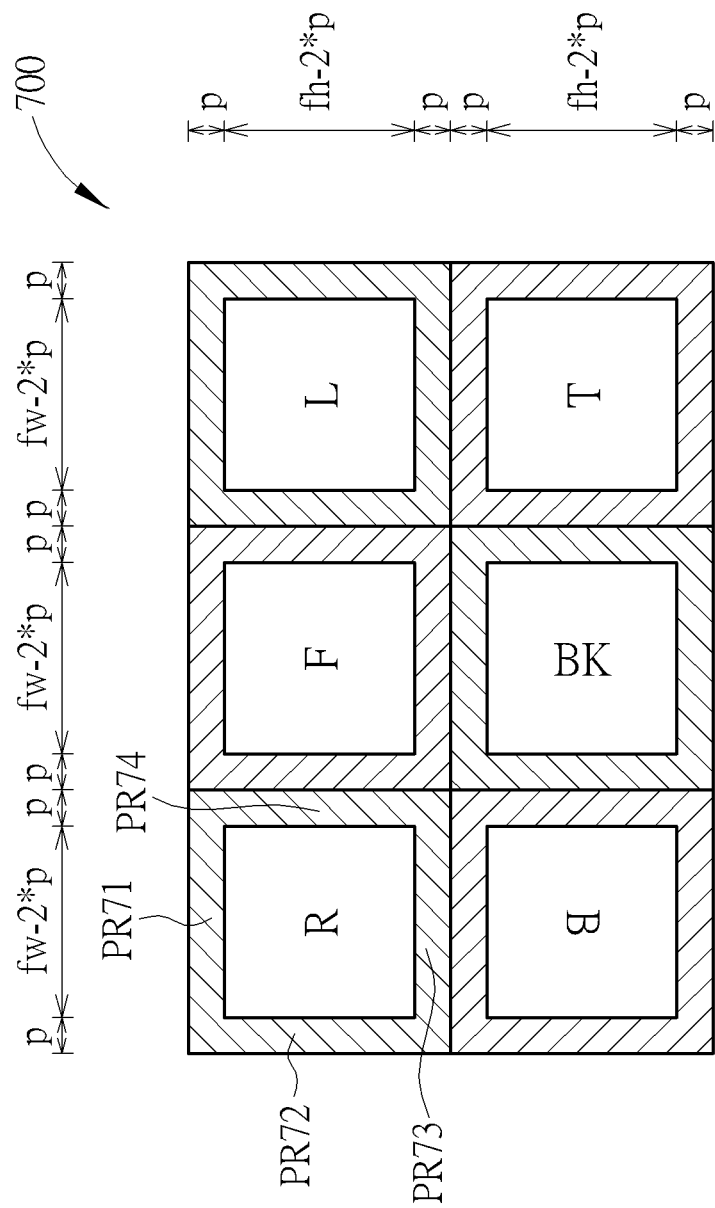
FIG. 7 is a diagram illustrating a third cube-based projection layout with padding and face scaling according to an embodiment of the present invention.

FIG. 7 is a diagram illustrating a third cube-based projection layout with padding and face scaling according to an embodiment of the present invention. Like the compact CMP layout with padding 300, the compact CMP layout with padding and face scaling 700 is capable of improving the image quality at discontinuous layout boundaries and discontinuous face edges after compression. In addition, padding is applied to continuous face edges according to the compact CMP layout with padding and face scaling 700. Compared to the compact CMP layout with padding 300, the compact CMP layout with padding and face scaling 700 has a smaller size. For example, the size of the compact CMP layout with padding and face scaling 700 is the same as that of a compact CMP layout without padding (e.g., compact CMP layout 204 shown in FIG. 2).

When the 360 VR projection layout L_VR is set by the compact CMP layout with padding and face scaling 700, the scaling circuit 117 and the padding circuit 118 implemented in the conversion circuit 114 are both enabled. For example, the conversion circuit 114 receives an omnidirectional image content of the sphere 200 from the video capture device 112, and obtains a plurality of square projection faces "Top", "Back", "Bottom", "Right", "Front", and "Left" from cube-based projection of the omnidirectional image content of the sphere 200, where the square projection faces "Top", "Back", "Bottom", "Right", "Front", and "Left" have the same face width fw and the same face height fh. The scaling circuit 117 is arranged to scale the square projection faces "Top", "Back", "Bottom", "Right", "Front", and "Left" to generate a plurality of scaled projection faces (labeled by "T", "BK", "B", "R", "F", and "L"), respectively. The orientation of the labels "T", "BK", "B", "R", "F", and "L" indicates the orientation of the projected image contents. In addition, the padding circuit 118 is arranged to generate at least one padding region. The conversion circuit 114 creates the projection-based frame IMG by packing scaled projection faces and padding regions in the compact CMP layout with padding and face scaling 700.

In accordance with the compact CMP layout with padding and face scaling 700, the padding circuit 118 creates a top padding region, a left padding region, a bottom padding region, and a right padding region for each scaled projection face, where each padding region has the same padding size p (e.g., p=4). Taking the scaled projection face "R" for example, it is enclosed by a top padding region PR71, a left padding region PR72, a bottom padding region PR73, and a right padding region PR74.

Compared to the compact CMP layout with padding and face scaling 400, the compact CMP layout with padding and face scaling 700 further includes padding applied to continuous face edges. If the right side of the scaled projection face "R" connects with the left side of the scaled projection face "F", an image content continuity edge exists between the right side of the scaled projection face "R" and the left side of the scaled projection face "F". If the right side of the scaled projection face "F" connects with the left side of the scaled projection face "L", an image content continuity edge exists between the right side of the scaled projection face "F" and the left side of the scaled projection face "L". If the right side of the scaled projection face "B" connects with the left side of the scaled projection face "BK", an image content continuity edge exists between the right side of the scaled projection face "B" and the left side of the scaled projection face "BK". If the right side of the scaled projection face "BK" connects with the left side of the scaled projection face "T", an image content continuity edge exists between the right side of the scaled projection face "BK" and the left side of the scaled projection face "T". A right padding region extended from the right side of the scaled projection face "R" and a left padding region extended from the left side of the scaled projection face "F" form a part of one vertical padding region that isolates the right side of the scaled projection face "R" from the left side of the scaled projection face "F". A right padding region extended from the right side of the scaled projection face "F" and a left padding region extended from the left side of the scaled projection face "L" form a part of one vertical padding region that isolates the right side of the scaled projection face "F" from the left side of the scaled projection face "L". A right padding region extended from the right side of the scaled projection face "B" and a left padding region extended from the left side of the scaled projection face "BK" form a part of one vertical padding region that isolates the right side of the scaled projection face "B" and the left side of the scaled projection face "BK". A right padding region extended from the right side of the scaled projection face "BK" and a left padding region extended from the left side of the scaled projection face "T" form a part of one vertical padding region that isolates the right side of the scaled projection face "BK" from the left side of the scaled projection face "T".

In this embodiment, all of the scaled projection faces "T", "BK", "B", "R", "F", and "L" have the same size. More specifically, a scaling operation of a square projection face is configured on the basis of padding region distribution associated with a scaled projection face obtained from the square projection face. Please refer to FIG. 7 in conjunction with FIG. 5. The scaled projection face "F" is generated from applying a scaling factor s' to both of the u-axis and the v-axis of the square projection face "Front", where $$s' = \frac{fw - 2p}{fw} = \frac{fh - 2p}{fh}.$$

The scaled projection face "BK" is generated from applying the scaling factor s' to both of the u-axis and the v-axis of the square projection face "Back". The scaled projection face "R" is generated from applying the scaling factor s' to both of the u-axis and the v-axis of the square projection face "Right". The scaled projection face "L" is generated from applying the scaling factor s' to both of the u-axis and the v-axis of the square projection face "Left". The scaled projection face "T" is generated from applying the scaling factor s' to both of the u-axis and the v-axis of the square projection face "Top". The scaled projection face "B" is generated from applying the scaling factor s' to both of the u-axis and the v-axis of the square projection face "Bottom". The settings of scaling factors for different square projection faces are listed in the following table.

| Face | Axis | Scaling Factor |
|---|---|---|
| Front | u | s' |
| Back | | |
| Right | | |
| Left | | |
| Top | v | s' |
| Bottom | | |

As shown in FIG. 7, each of the scaled projection faces "R", "F", "L", "B", "BK", and "T" has a size of (fw−2*p)*(fh−2*p). When the projection-based frame IMG has the compact CMP layout with padding and face scaling 700, the projection-based frame IMG has a frame width W=3*fw and a frame height H=2*fh. Hence, a size of a projection-based frame using the compact CMP layout with padding and face scaling 700 remains the same as that of a projection-based frame using a compact CMP layout without padding (e.g., compact CMP layout 204 shown in FIG. 2).

In one exemplary padding implementation, the padding circuit 118 applies geometry padding to a scaled projection face to determine pixel values of pixels included in a padding region that connects with at least the scaled projection face. Taking the compact CMP layout with padding and face scaling 400 for example, the top padding region PR31 includes a left geometry mapping region, a middle geometry mapping region, and a right geometry mapping region. The left geometry mapping region of the top padding region PR31 is obtained from mapping the image content of a region on the sphere 200 onto the left geometry mapping region, wherein the region on the sphere 200 is adjacent to a region from which the scaled projection face "R" is obtained. Hence, there is image content continuity between the scaled projection face "R" and the left geometry mapping region extended from the scaled projection face "R" (i.e., image content is continuously represented in the scaled projection face "R" and the left geometry mapping region). Similarly, the middle geometry mapping region of the top padding region PR31 is obtained from mapping the image content of a region on the sphere 200 onto the middle geometry mapping region, wherein the region on the sphere 200 is adjacent to a region from which the scaled projection face "F" is obtained. Hence, there is image content continuity between the scaled projection face "F" and the middle geometry mapping region extended from the scaled projection face "F" (i.e., image content is continuously represented in the scaled projection face "F" and the middle geometry mapping region). In addition, the right geometry mapping region of the top padding region PR31 is obtained from mapping the image content of a region on the sphere 200 onto the right geometry mapping region, wherein the region on the sphere 200 is adjacent to a region from which the scaled projection face "L" is obtained. Hence, there is image content continuity between the scaled projection face "L" and the right geometry mapping region extended from the scaled projection face "L" (i.e., image content is continuously represented in the scaled projection face "L" and the right geometry mapping region).

In another exemplary padding implementation, the padding circuit 118 sets pixel values of pixels included in a padding region by duplicating pixel values of specific pixels included in a scaled projection face that connects with the padding region. Taking the compact CMP layout with padding and face scaling 400 for example, the top padding region PR31 includes a left duplication region, a middle duplication region, and a right duplication region. Regarding generation of the left duplication region of the top padding region PR31, edge pixels at the top side of the scaled projection face "R" are duplicated to create padding pixels extended from the top side of the scaled projection face "R". Regarding generation of the middle duplication region of the top padding region PR31, edge pixels at the top side of the scaled projection face "F" are duplicated to create padding pixels extended from the top side of the scaled projection face "F". Regarding generation of the right duplication region of the top padding region PR31, edge pixels at the top side of the scaled projection face "L" are duplicated to create padding pixels extended from the top side of the scaled projection face "L".

In yet another exemplary padding implementation, the padding circuit 118 sets pixel values of pixels included in a padding region extended from one side of a first scaled projection face by duplicating pixel values of specific pixels included in a second scaled projection face. For example, the first scaled projection face is obtained from an image content of a first region on a sphere, and the second scaled projection face is obtained from an image content of a second region on the sphere, where the second region is adjacent to the first region. A padding region extended from one side of the first scaled projection face can be obtained from duplicating a partial region of the second scaled projection face. Taking the compact CMP layout with padding and face scaling 400 for example, the top padding region PR31 includes a left duplication region, a middle duplication region, and a right duplication region. The left duplication region of the top padding region PR31 is set by duplicating a first partial region of the scaled projection face "T". The middle duplication region of the top padding region PR31 is set by duplicating a second partial region of the scaled projection face "T". The right duplication region of the top padding region PR31 is set by duplicating a third partial region of the scaled projection face "T".

As mentioned above, the video decoder 122 of the destination electronic device 104 receives the bitstream BS from the transmission means 103, and performs a video decoding function for decoding a part of the received bitstream BS to generate the decoded frame IMG' that is a decoded projection-based frame having the same 360 VR projection layout L_VR employed by the conversion circuit 114 of the source electronic device 102. In a case where the 360 VR projection layout L_VR is set by a cube-based projection layout with padding (e.g., compact CMP layout with padding 300 or compact CMP layout with padding and face scaling 400/600/700), the decoded frame IMG' has padding regions located at discontinuous layout boundaries, discontinuous face edges, and/or continuous face edges of a projection layout. In one embodiment, the video decoder 122 may crop the padding regions, such that only the non-padding regions (e.g., square projection faces originally obtained from cube-based projection, or scaled projection faces derived from scaling square projection faces originally obtained from cube-based projection) are reconstructed. In an alternative design, the video decoder 122 may enable a blending circuit 127 that is arranged to perform blending after coding. The blending circuit 127 performs a blending function that is based on padding pixels in a padding region and face pixels (i.e., non-padding pixels) in a projection face. Hence, during the decoding process of generating the decoded frame IMG', the video decoder 122 reconstructs a first pixel by blending a decoded pixel value obtained for the first pixel and a decoded pixel value obtained for a second pixel to generate an updated pixel value of the first pixel, where one of the first pixel and the second pixel is included in a projection face, and another of the first pixel and the second pixel is included in a padding region.

The blending circuit 127 is an electronic circuit. In one exemplary design, the blending circuit 127 may be implemented by dedicated hardware for dealing with the blending function. In another exemplary design, the blending circuit 127 may be implemented by a processor which executes a program code for dealing with the blending function. However, these are for illustrative purposes only, and are not meant to be limitations of the present invention.

Figure 8:
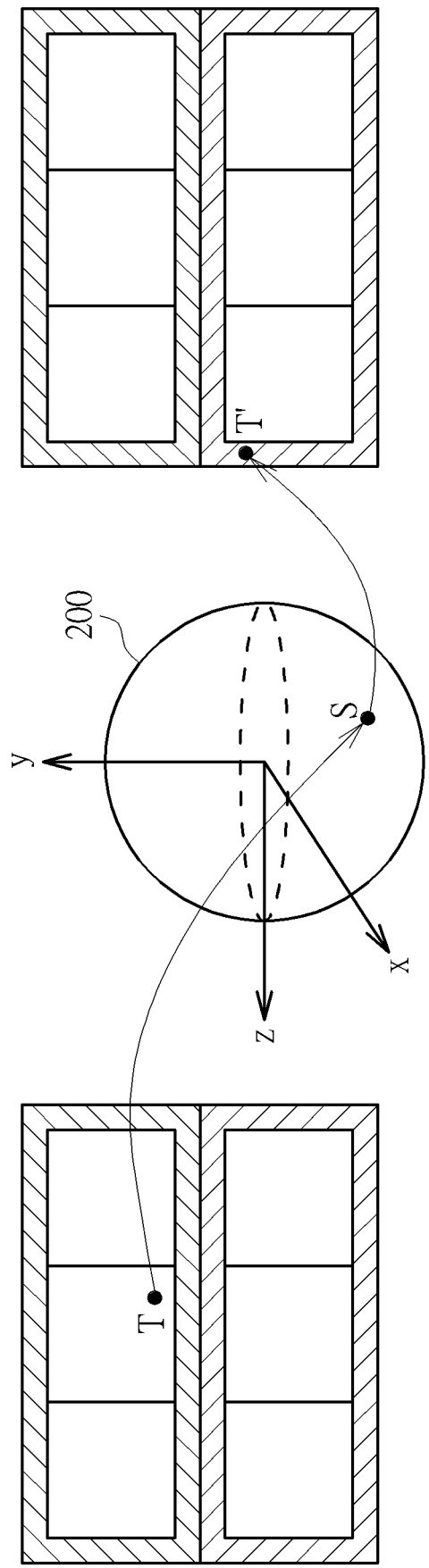
FIG. 8 is a diagram illustrating a process of finding a corresponding padding pixel for a face pixel according to an embodiment of the present invention.

For example, a pixel value of a face pixel (non-padding pixel) in a projection face (non-padding region) may be updated by blending an original decoded pixel value of the face pixel with a decoded pixel value of a corresponding padding pixel in a padding region. In a case where geometry mapping is employed by the padding circuit 118 at the encoder side, mapping from a face pixel to its corresponding padding pixel is required. FIG. 8 is a diagram illustrating a process of finding a corresponding padding pixel for a face pixel according to an embodiment of the present invention. The face pixel T is first mapped to a 3D point S on the sphere 200. Next, the 3D point S on the sphere 200 is projected to the second nearest face via cube-based projection to find the corresponding padding pixel T'. The corresponding padding pixel T' found in the padding region may not be at an integer position. If at least one of a u-axis coordinate u and a v-axis coordinate v of the corresponding padding pixel T' is a non-integer position, an interpolation filter (not shown) in the video decoder 122 (particularly, blending circuit 127) may be applied to decoded pixel values of integer pixels around the corresponding padding pixel T' to derive a decoded pixel value of the corresponding padding pixel T'.

Figure 9:
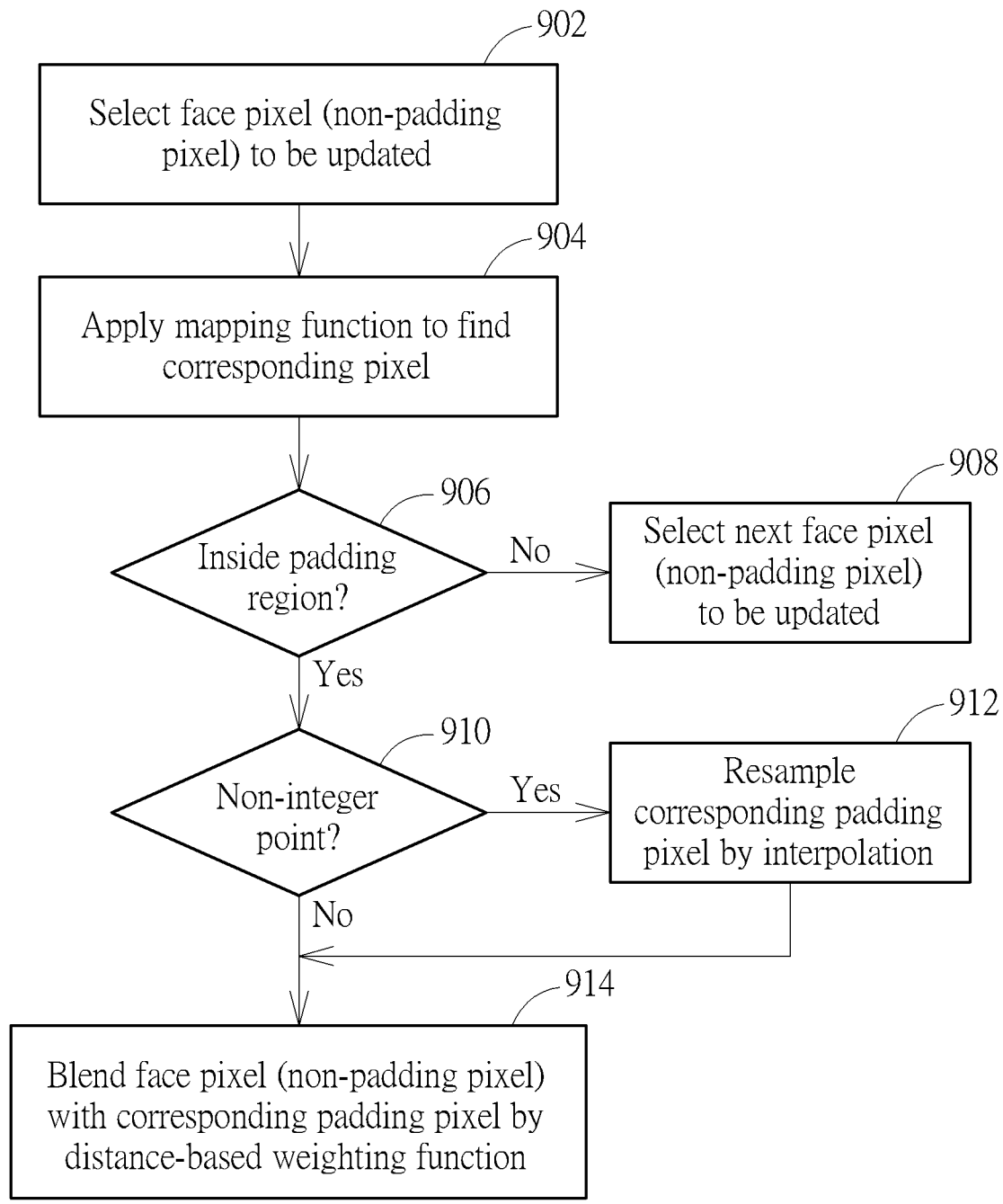
FIG. 9 is a flowchart illustrating a blending method for generating an updated pixel value of a face pixel according to an embodiment of the present invention.

FIG. 9 is a flowchart illustrating a blending method for generating an updated pixel value of a face pixel according to an embodiment of the present invention. At step 902, the blending circuit 127 selects a face pixel from one projection face packed in a cube-based projection layout (e.g., compact CMP layout with padding 300 or compact CMP layout with padding and face scaling 400/600/700). At step 904, the blending circuit 127 applies mapping functions to find a corresponding pixel, where the face pixel to be updated and the corresponding pixel are mapped to the same 3D point on a sphere in a 3D space. At step 906, the blending circuit 127 checks if the corresponding pixel is inside a padding region packed in the cube-based projection layout. That is, the blending circuit 127 checks if the corresponding pixel is a padding pixel. If the corresponding pixel is not a padding pixel, the flow proceeds with step 908. At step 908, a blending process of the currently selected face pixel is aborted, and the blending circuit 127 selects a next face pixel to be updated from one projection face packed in the cube-based projection layout.

If the corresponding pixel is a padding pixel, the flow proceeds with step 910. At step 910, the blending circuit 127 checks if the corresponding padding pixel found in the padding region is a non-integer point. If the corresponding padding pixel found in the padding region is an integer point, the flow proceeds with step 914. If the corresponding padding pixel found in the padding region is a non-integer point, the blending circuit 127 resamples the corresponding padding pixel by interpolation (step 912). That is, an interpolation filter (not shown) in the blending circuit 127 is used to apply interpolation to decoded pixel values of integer pixels around the corresponding padding pixel (which is a non-integer pixel) to derive a decoded pixel value of the corresponding padding pixel. At step 914, the blending circuit 127 blends a decoded pixel value of the face pixel with a decoded pixel value of the corresponding padding pixel to generate an updated pixel value of the face pixel. In some embodiments of the present invention, a distance-based weighting scheme can be adopted by the blending circuit 127.

Figure 10:
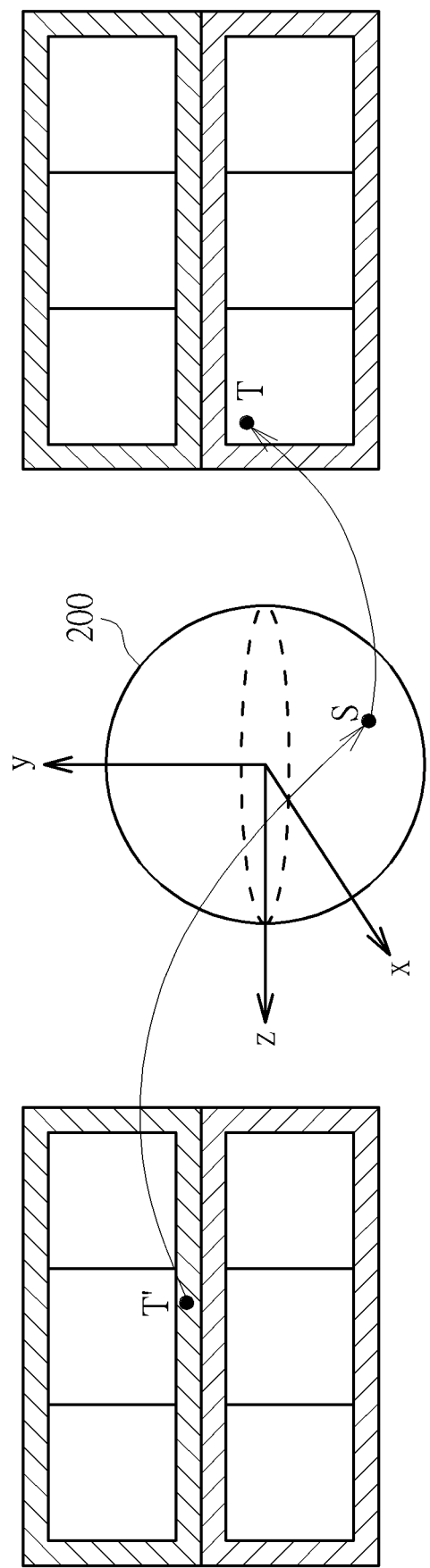
FIG. 10 is a diagram illustrating a process of finding a corresponding face pixel for a padding pixel according to an embodiment of the present invention.

For another example, a pixel value of a padding pixel in a padding region may be updated by blending an original decoded pixel value of the padding pixel in the padding region and a pixel value of a corresponding face pixel (non-padding pixel) in a projection face (non-padding region). In a case where geometry mapping is employed by the padding circuit 118 at the encoder side, mapping from a padding pixel to its corresponding face pixel is required. FIG. 10 is a diagram illustrating a process of finding a corresponding face pixel for a padding pixel according to an embodiment of the present invention. The padding pixel T' is first mapped to a 3D point S on the sphere 200. Next, the 3D point S on the sphere 200 is projected to a nearest face to find the corresponding face pixel T. The corresponding face pixel T found in the projection face may not be at an integer position. If at least one of a u-axis coordinate u and a v-axis coordinate v of the corresponding face pixel T is a non-integer position, an interpolation filter (not shown) in the video decoder 122 (particularly, blending circuit 127) may be applied to decoded pixel values of integer pixels around the corresponding face pixel T to derive a decoded pixel value of the corresponding face pixel T.

Figure 11:
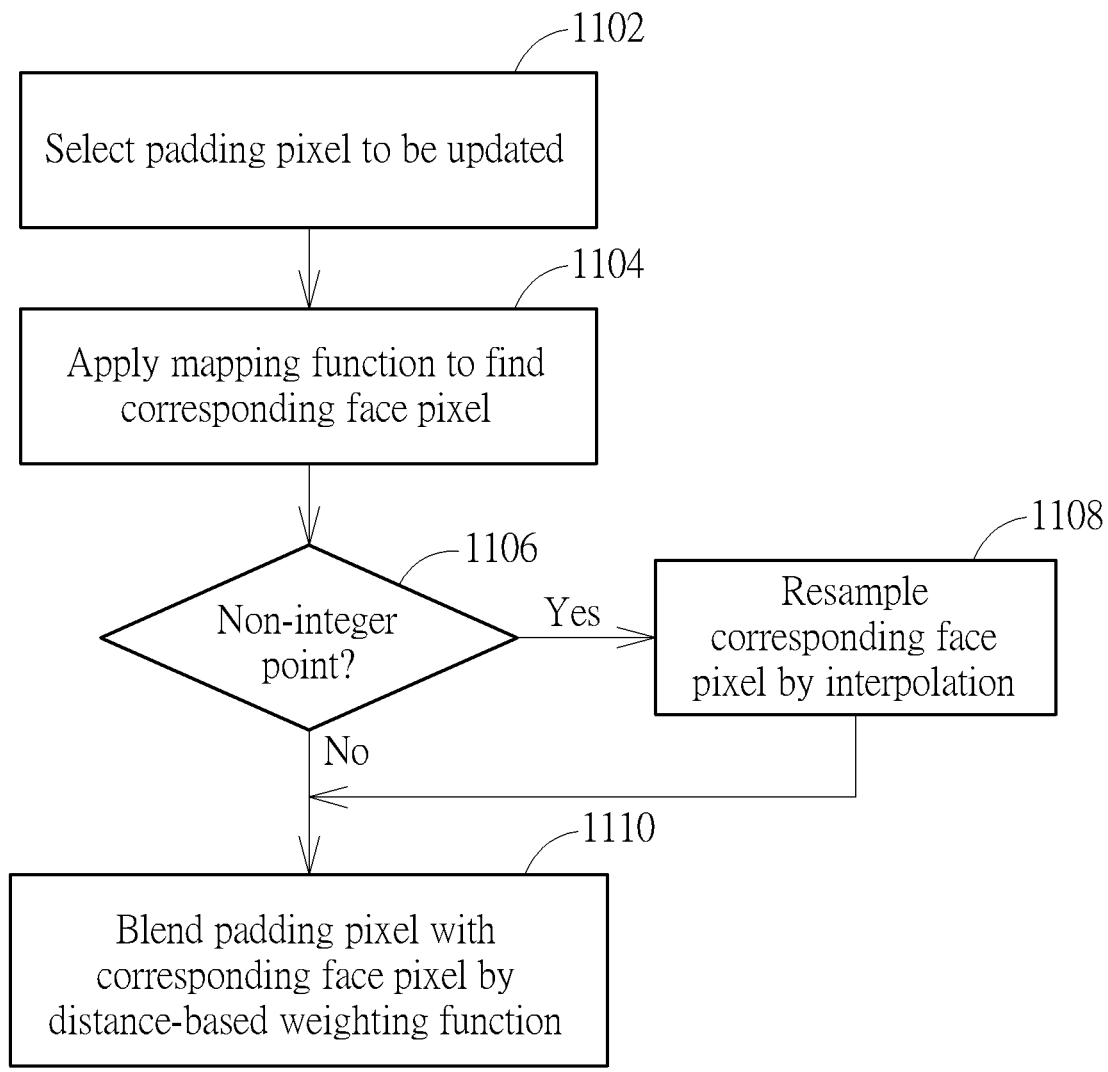
FIG. 11 is a flowchart illustrating a blending method for generating an updated pixel value of a padding pixel according to an embodiment of the present invention.

FIG. 11 is a flowchart illustrating a blending method for generating an updated pixel value of a padding pixel according to an embodiment of the present invention. At step 1102, the blending circuit 127 selects a padding pixel from one padding region packed in a cube-based projection layout (e.g., compact CMP layout with padding 300 or compact CMP layout with padding and face scaling 400/600/700). At step 1104, the blending circuit 127 applies mapping functions to find a corresponding face pixel, where the padding pixel to be updated and the corresponding face pixel are mapped to the same 3D point on a sphere in a 3D space. At step 1106, the blending circuit 127 checks if the corresponding face pixel found in the projection face is a non-integer point. If the corresponding face pixel found in the projection face is an integer point, the flow proceeds with step 1110. If the corresponding face pixel found in the projection face is a non-integer point, the blending circuit 127 resamples the corresponding face pixel by interpolation (step 1108). That is, an interpolation filter (not shown) in the blending circuit 127 is used to apply interpolation to decoded pixel values of integer pixels around the corresponding face pixel (which is a non-integer pixel) to derive a decoded pixel value of the corresponding face pixel. At step 1110, the blending circuit 127 blends a decoded pixel value of the padding pixel with a decoded pixel value of the corresponding face pixel to generate an updated pixel value of the padding pixel. In some embodiments of the present invention, a distance-based weighting scheme can be adopted by the blending circuit 127.

Figure 12:
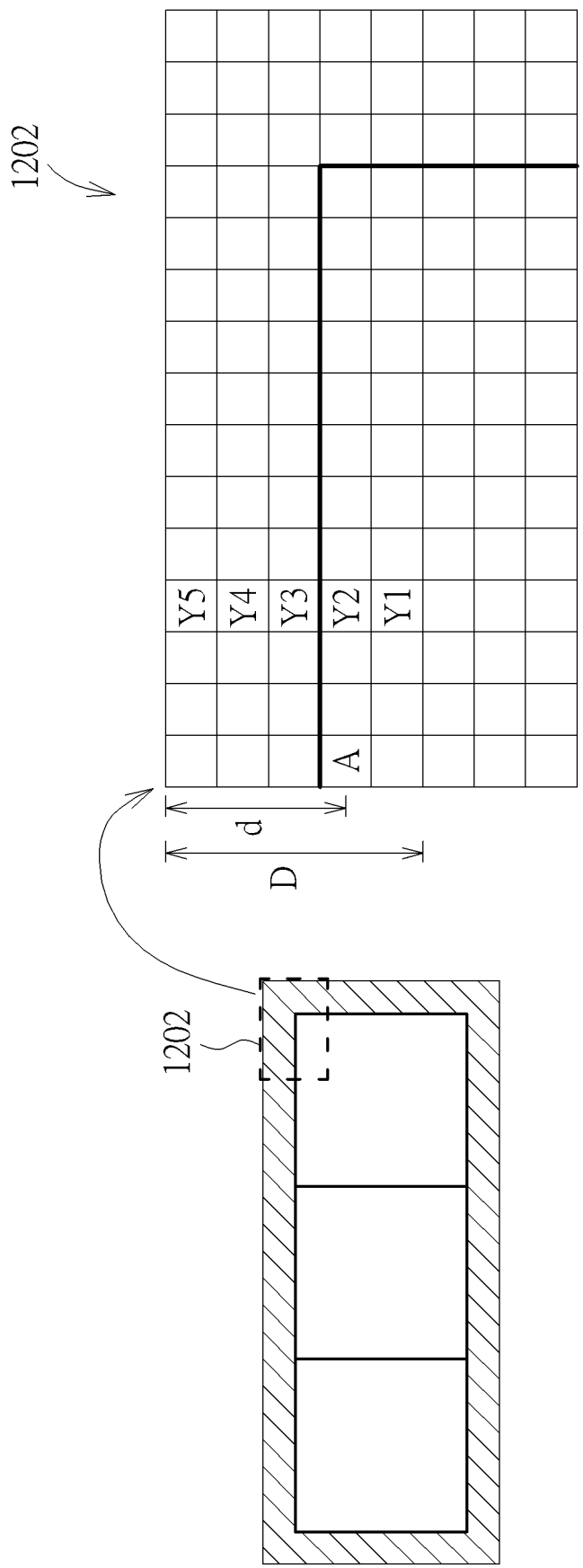
FIG. 12 is a diagram illustrating a first decoder-side blending operation according to an embodiment of the present invention.

FIG. 12 is a diagram illustrating a first decoder-side blending operation according to an embodiment of the present invention. As shown in FIG. 12, padding is applied around a 3×1 face row. For example, the exemplary padding design shown in FIG. 3/FIG. 4 may be employed by the padding circuit 118. Hence, the 3×1 face row may include projection faces obtained from a right face, a front face, and a left face of a cube, or may include projection faces obtained from a bottom face, a back face, and a top face of the cube. A partial area 1202 at a top-right corner of the 3×1 face row is enlarged to illustrate a first blending method employed by the blending circuit 127. After coding, blending can be applied with a distance-based weighting function as shown below to update a target pixel by blending with its corresponding pixel that is found by mapping functions.

$$A_{update} = \frac{A \cdot d + A' \cdot (D-d)}{D} \quad (1)$$

In above formula (1), A represents a decoded pixel value obtained for the target pixel, $A_{update}$ represents the updated pixel value of the target pixel, A' represents a decoded pixel value obtained for a corresponding pixel, D represents a width of pixels to be blended, and d represents a distance from the target pixel to a padding boundary. For example, the parameter d may be set by a non-integer value that is counted from a center of the target pixel to the padding boundary.

The blending circuit 127 applies a first weighting factor $$\frac{d}{D}$$

to the decoded pixel value A obtained for the target pixel, and applies a second weighting factor $$\frac{D-d}{D}$$

to the decoded pixel value A' obtained for the corresponding pixel, where settings of the first weighting factor and the second weighting factor both depend on a location of the target pixel to be updated, and are independent of a padding size of the padding region.

Suppose that face pixels (non-padding pixels) Y1 and Y2 and padding pixels Y3, Y4, Y5 in the same pixel column are needed to be updated by blending. The parameter D may be set by 5. When the target pixel to be updated is the face pixel Y1, the parameter d may be set by 4.5. When the target pixel to be updated is the face pixel Y2, the parameter d may be set by 3.5. When the target pixel to be updated is the padding pixel Y3, the parameter d may be set by 2.5. When the target pixel to be updated is the padding pixel Y4, the parameter d may be set by 1.5. When the target pixel to be updated is the padding pixel Y5, the parameter d may be set by 0.5.

Figure 13:
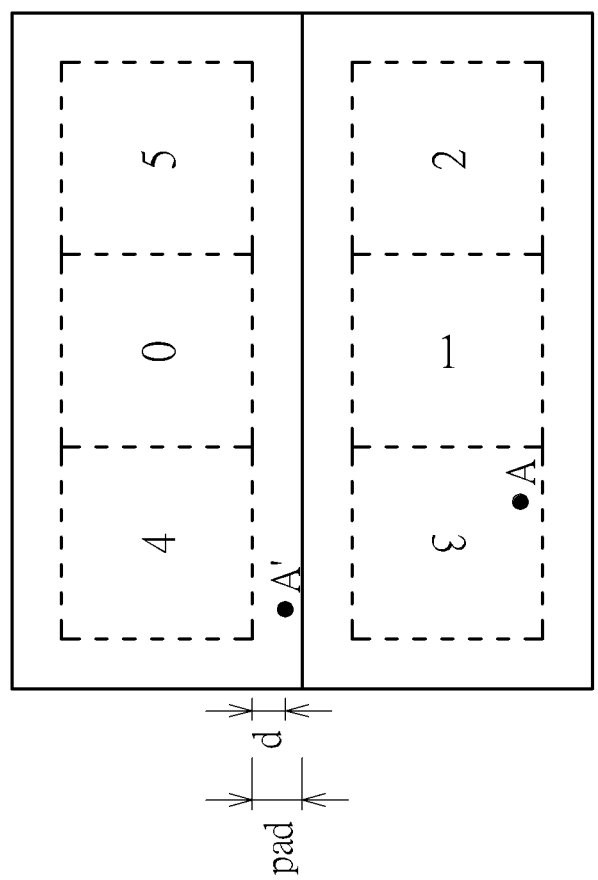
FIG. 13 is a diagram illustrating a second decoder-side blending operation according to an embodiment of the present invention.

FIG. 13 is a diagram illustrating a second decoder-side blending operation according to an embodiment of the present invention. As shown in FIG. 13, padding is applied around two 3×1 face rows. One 3×1 face row includes a right face (labeled by "4"), a front face (labeled by "0") and a left face (labeled by "5"). The other 3×1 face row includes a bottom face (labeled by "3"), a back face (labeled by "1") and a top face (labeled by "2"). The orientation of the labels "0"-"5" indicates the orientation of the projected image contents. For example, the exemplary padding design shown in FIG. 3/FIG. 4 may be employed by the padding circuit 118. A reconstructed pixel value of a target pixel (which is a face pixel) in a projection face is an updated pixel value that can be computed by using a following formula.

$$A_{update} = \frac{A' \cdot (pad - d) + A \cdot (pad + d)}{2 \cdot pad} \quad (2)$$

In above formula (2), A represents a decoded pixel value obtained for the target pixel (which is a face pixel), $A_{update}$ represents the updated pixel value of the target pixel, A' represents a decoded pixel value obtained for a corresponding pixel (which is a padding pixel found by mapping functions), pad represents a padding size of the padding region, and d represents a distance between the corresponding pixel and one side of the projection face (which is a non-padding region). Specifically, the blending circuit 127 applies a first weighting factor $$\frac{pad - d}{2 \cdot pad}$$

to the decoded pixel value A' obtained for the corresponding pixel (which is a padding pixel), and applies a second weighting factor $$\frac{pad + d}{2 \cdot pad}$$

to the decoded pixel value A obtained for the target pixel (which is a face pixel), where settings of the first weighting factor and the second weighting factor both depend on a location of the corresponding pixel and the padding size of the padding region.

Figure 14:
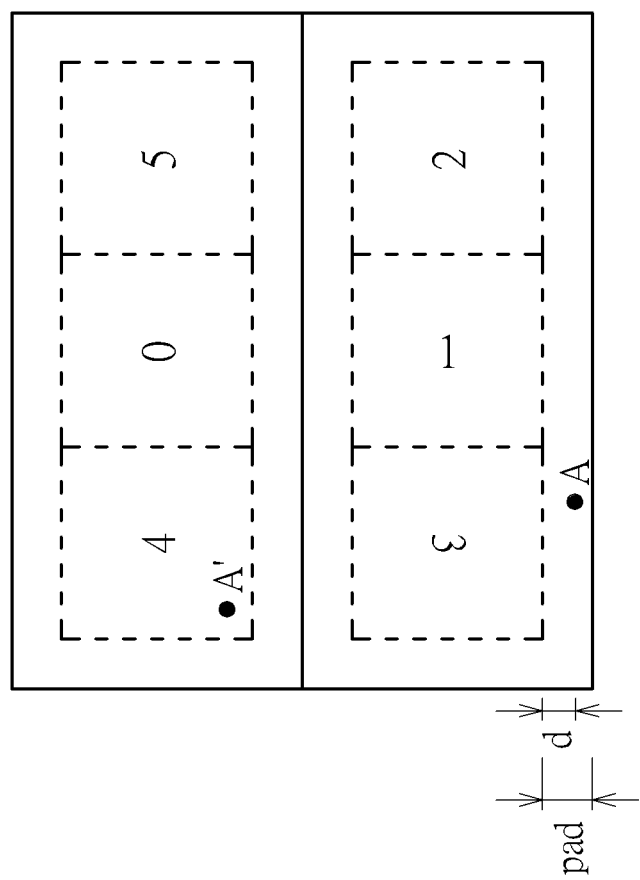
FIG. 14 is a diagram illustrating a third decoder-side blending operation according to an embodiment of the present invention.

FIG. 14 is a diagram illustrating a third decoder-side blending operation according to an embodiment of the present invention. As shown in FIG. 14, padding is applied around two 3×1 face rows. One 3×1 face row includes a right face (labeled by "4"), a front face (labeled by "0") and a left face (labeled by "5"). The other 3×1 face row includes a bottom face (labeled by "3"), a back face (labeled by "1") and a top face (labeled by "2"). The orientation of the labels "0"-"5" indicates the orientation of the projected image contents. For example, the exemplary padding design shown in FIG. 3/FIG. 4 may be employed by the padding circuit 118. A reconstructed pixel value of a target pixel (which is a padding pixel) in a padding region is an updated pixel value that can be computed by using a following formula.

$$A_{update} = \frac{A' \cdot (pad + d) + A \cdot (pad - d)}{2 \cdot pad} \quad (3)$$

In above formula (3), A represents a decoded pixel value obtained for the target pixel (which is a padding pixel), $A_{update}$ represents the updated pixel value of the target pixel, A' represents a decoded pixel value obtained for a corresponding pixel (which is a face pixel found by mapping functions), pad represents a padding size of the padding region, and d represents a distance between the target pixel and one side of the projection face (which is a non-padding region). Specifically, the blending circuit 127 applies a first weighting factor $$\frac{\text{pad} + d}{2 \cdot \text{pad}}$$

to the decoded pixel value A' obtained for the corresponding pixel (which is a face pixel), and applies a second weighting factor $$\frac{\text{pad} - d}{2 \cdot \text{pad}}$$

to the decoded pixel value A obtained for the target pixel (which is a padding pixel), where settings of the first weighting factor and the second weighting factor both depend on a location of the target pixel and the padding size of the padding region.

Regarding a cube-based projection layout with padding and/or face scaling (e.g., compact CMP layout with padding 300 or compact CMP layout with padding and face scaling 400/600/700), a discontinuous edge exists between two adjacent padding regions extended from different projection faces. When a block-based coding scheme is employed by the video encoder 116, the decoded pixel values of pixels that are near the discontinuous edge and located on one side of the discontinuous edge may be influenced by pixels that are near the discontinuous edge and located on the other side of the discontinuous edge. As mentioned above, blending is applied to a decoded pixel value of a target pixel and a decoded pixel value of a corresponding pixel for updating the decoded pixel of the target pixel. If the corresponding pixel is near the discontinuous edge, the decoded pixel value of the corresponding pixel after coding may be greatly deviated from the original pixel value of the corresponding pixel before coding. As a result, the target pixel updated by blending may result in picture quality degradation. To address this issue, the present invention proposes a partially skipped blending scheme. In accordance with the partially skipped blending scheme, the blending circuit 127 compares a distance between an image content discontinuity edge and a corresponding pixel found for a target pixel to be updated with a predetermined threshold. Blending of a decoded pixel value obtained for the target pixel and a decoded pixel value obtained for the corresponding pixel is performed under a condition that the distance exceeds the predetermined threshold. In other words, blending of the decoded pixel value obtained for the target pixel and the decoded pixel value obtained for the corresponding pixel is skipped when the distance is less than predetermined threshold.

Figure 15:
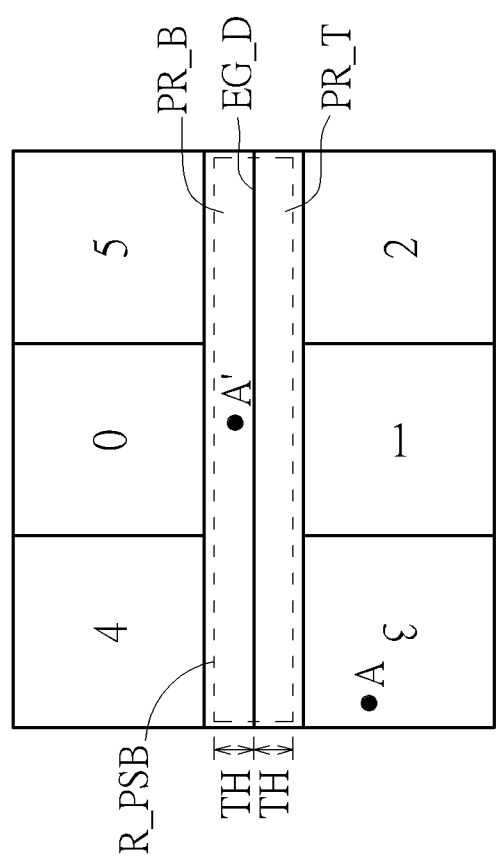
FIG. 15 is a diagram illustrating an example of checking a location of a corresponding pixel to selectively enable a decoder-side blending computation for updating a pixel value of a target pixel.

FIG. 15 is a diagram illustrating an example of checking a location of a corresponding pixel to selectively enable a decoder-side blending computation for updating a pixel value of a target pixel. In this example, padding is only applied to a middle of a frame to separate two discontinuous 3×1 face rows. Hence, one horizontal padding region PR_B includes padding regions extended from bottom sides of a right face (labeled by "4"), a front face (labeled by "0") and a left face (labeled by "5") packed in a cube-based projection layout with padding and/or face scaling, and another horizontal padding region PR_T includes padding regions extended from top sides of a bottom face (labeled by "3"), a back face (labeled by "1") and a top face (labeled by "2") packed in the cube-based projection layout with padding and/or face scaling. There is a discontinuous edge EG_D between the horizontal padding regions PR_B and PR_T. Suppose that geometry padding is employed for setting padding pixels in the horizontal padding regions PR_B and PR_T. When the target pixel to be updated is a face pixel A, a corresponding padding pixel A' is found in the horizontal padding region PR_B through mapping functions. The blending circuit 127 compares a distance between the corresponding padding pixel A' and the discontinuous edge EG_D with a predetermined threshold TH. Since the distance between the corresponding padding pixel A' and the discontinuous edge EG_D is less than the predetermined threshold TH, it implies that the corresponding padding pixel A' is near the discontinuous edge EG_D. Hence, the blending circuit 127 skips a blending process of updating a decoded pixel value of the face pixel A. More specifically, blending is skipped for a target pixel when a corresponding pixel is located within a region R_PSB defined by the predetermined threshold TH.

Control information may be signaled from the source electronic device 102 to the destination electronic device 104 through the bitstream. BS. For example, at least one of flags FL1-FL5 is included in the bitstream BS that is transmitted from the source electronic device 102 to the destination electronic device 104.

In some embodiments of the present invention, the scaling circuit 117 may be selectively enabled. When the 360 VR projection layout L_VR is set by a cube-based projection layout with padding (e.g., compact CMP layout with padding 300), the scaling circuit 117 is disabled. When the 360 VR projection layout L_VR is set by a cube-based projection layout with padding and face scaling (e.g., compact CMP layout with padding and face scaling 400/600/700), the scaling circuit 117 is enabled. The flag FL1 can be added to the bitstream BS, where the signaled flag FL1 is indicative of whether projection faces packed in a projection layout are scaled.

In some embodiments of the present invention, the padding circuit 118 may support a plurality of padding arrangements, including "padding around two 3×1 face rows", "padding applied to the middle of the frame only", "padding applied around each face", and "disabling the padding". One or both of the flags FL2 and flag FL3 can be added to the bitstream BS, where the signaled flag FL2 is indicative of a padding arrangement of padding regions packed in a projection layout, and the signaled flag FL3 is indicative of a padding size of each padding region packed in the projection layout.

In some embodiments of the present invention, the blending circuit 127 may be selectively enabled. In addition, the blending circuit 127 may support different blending methods, including "blending method 1 (which adopts the aforementioned formula (1))", "blending method 2 (which adopts the aforementioned formulas (2) and (3))", and "totally skipped blending". The flag FL4 can be added to the bitstream BS, where the signaled flag FL4 is indicative of a blending method that will be assigned to the blending circuit 127. For example, the video decoder 122 derives the signaled flag FL4 from the bitstream BS, and then the blending circuit 127 refers to the blending method indicated by the signaled flag FL4 to compute an updated pixel value of a target pixel, where the target pixel may be a face pixel included in one projection face or a padding pixel included in one padding region.

Furthermore, the blending circuit 127 may support a blending method "partially skipped blending". The flag FL5 can be added to the bitstream BS, where the signaled flag FL5 is indicative of whether the blending method "partially skipped blending" should be enabled. For example, the video decoder 122 derives the signaled flag FL5 from the bitstream BS, and then the blending circuit 127 refers to the signaled flag FL5 to determine whether to enable the blending method "partially skipped blending" for computing an updated pixel value of a target pixel, where the target pixel may be a face pixel included in one projection face or a padding pixel included in one padding region.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video processing method comprising:
    obtaining a plurality of square projection faces from an omnidirectional content of a sphere according to a cube-based projection;
    scaling the square projection faces to generate a plurality of scaled projection faces, respectively;
    generating a projection-based frame by packing at least the scaled projection faces in a projection layout of the cube-based projection; and
    encoding the projection-based frame to generate a part of a bitstream;
    wherein scaling the square projection faces to generate the scaled projection faces comprises:
    generating each scaled projection face included in a first group of scaled projection faces by applying scaling to only one of a height direction and a width direction of one projection face included in a first group of projection faces, wherein a size of said each scaled projection face included in the first group of scaled projection faces is smaller than a size of the corresponding projection face included in the first group of projection faces; and
    generating each scaled projection face included in a second group of scaled projection faces by applying scaling to both of a height direction and a width direction of one projection face included in a second group of projection faces, wherein a size of said each scaled projection face included in the second group of scaled projection faces is smaller than a size of the corresponding projection face included in the second group of projection faces.

2. The video processing method of claim 1, wherein the scaled projection faces includes a first scaled projection face and a second scaled projection face that have different sizes.

3. The video processing method of claim 1, wherein for each scaled projection face included in the first group of scaled projection faces, scaling is applied to only one of the height direction and the width direction of the scaled projection face according to a first scaling factor; and for each scaled projection face included in the second group of scaled projection faces, scaling is applied to one of the height direction and the width direction of the scaled projection face according to the first scaling factor, and scaling is applied to another of the height direction and the width direction of the scaled projection face according to a second scaling factor that is different from the first scaling factor.

4. The video processing method of claim 1, further comprising:
    adding a flag to the bitstream, wherein the flag is indicative of whether projection faces packed in the projection layout are scaled.

5. The video processing method of claim 1, further comprising:
    creating, by a padding circuit, at least one padding region;
    wherein the projection-based frame is generated by packing the scaled projection faces and said at least one padding region in the projection layout of the cube-based projection.

6. The video processing method of claim 5, wherein the scaled projection faces packed in the projection layout comprise a first scaled projection face; said at least one padding region packed in the projection layout comprises a first padding region; the first padding region connects with at least the first scaled projection face, and forms at least a portion of one boundary of the projection layout.

7. The video processing method of claim 6, wherein the scaled projection faces further comprise a second scaled projection face; there is an image content discontinuity edge between one side of the first scaled projection face and one side of the second scaled projection face if said one side of the first scaled projection face connects with said one side of the scaled second projection face; said at least one padding region further comprises a second padding region; and the second padding region connects with said one side of the first scaled projection face and said one side of the second scaled projection face for isolating said one side of the first scaled projection face from said one side of the second scaled projection face in the projection layout.

8. The video processing method of claim 5, wherein the scaled projection faces packed in the projection layout comprise a first scaled projection face; said at least one padding region packed in the projection layout comprises a first padding region that connects with at least the first scaled projection face; and generating said at least one padding region comprises:
    applying geometry padding to the first projection face to determine pixel values of pixels included in the first padding region.

9. The video processing method of claim 5, wherein the scaled projection faces packed in the projection layout comprise a first scaled projection face; said at least one padding region packed in the projection layout comprises a first padding region that connects with at least the first scaled projection face; and generating said at least one padding region comprises:
    setting pixel values of pixels included in the first padding region by duplicating pixel values of specific pixels included in the first projection face.

10. The video processing method of claim 5, wherein the scaled projection faces packed in the projection layout comprise a first scaled projection face and a second scaled projection face; said at least one padding region packed in the projection layout comprises a first padding region that connects with at least the first scaled projection face; and generating said at least one padding region comprises:
    setting pixel values of pixels included in the first padding region by duplicating pixel values of specific pixels included in the second projection face.

11. The video processing method of claim 5, further comprising:
    adding a flag to the bitstream, wherein the flag is indicative of a padding arrangement of said at least one padding region packed in the projection layout.

12. The video processing method of claim 5, further comprising:
adding a flag to the bitstream, wherein the flag is indicative of a padding size of said at least one padding region packed in the projection layout.

13. A video processing method comprising:
receiving a bitstream; and
decoding, by a decoding circuit, a part of the bitstream to generate a decoded projection-based frame, wherein the decoded projection-based frame comprises a plurality of scaled projection faces packed in a projection layout of a cube-based projection, the scaled projection faces are results of scaling a plurality of square projection faces, respectively, and an omnidirectional content of a sphere is mapped onto the square projection faces via the cube-based projection;
wherein the scaled projection faces comprise a first group of scaled projection faces and a second group of scaled projection faces; each scaled projection face included in the first group of scaled projection faces is generated by applying scaling to only one of a height direction and a width direction of one projection face included in a first group of projection faces, wherein a size of said each scaled projection face included in the first group of scaled projection faces is smaller than a size of the corresponding projection face included in the first group of projection faces; and each scaled projection face included in the second group of scaled projection faces is generated by applying scaling to both of a height direction and a width direction of one projection face included in a second group of projection faces, wherein a size of said each scaled projection face included in the second group of scaled projection faces is smaller than a size of the corresponding projection face included in the second group of projection faces.

14. The video processing method of claim 13, further comprising:
deriving a flag from the bitstream, wherein the flag is indicative of whether projection faces packed in the projection layout are scaled.

15. The video processing method of claim 13, wherein the decoded projection-based frame further comprises at least one padding region packed in the projection layout of the cube-based projection.

16. The video processing method of claim 15, further comprising:
deriving a flag from the bitstream, wherein the flag is indicative of a padding arrangement of said at least one padding region packed in the projection layout.

17. The video processing method of claim 15, further comprising:
deriving a flag from the bitstream, wherein the flag is indicative of a padding size of said at least one padding region packed in the projection layout.

* * * * *